US010500905B2

(12) United States Patent
Dunning et al.

(10) Patent No.: US 10,500,905 B2
(45) Date of Patent: Dec. 10, 2019

(54) VEHICLE WHEEL ASSEMBLY

(71) Applicant: JAGUAR LAND ROVER LIMITED, Whitley, Coventry, Warwickshire (GB)

(72) Inventors: Emma-Claire Dunning, Coventry (GB); Maelle Dodu, Leamington Spa (GB); Robbie Lesbirel, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 195 days.

(21) Appl. No.: 15/547,260

(22) PCT Filed: Jan. 28, 2016

(86) PCT No.: PCT/EP2016/051814
§ 371 (c)(1),
(2) Date: Jul. 28, 2017

(87) PCT Pub. No.: WO2016/120389
PCT Pub. Date: Aug. 4, 2016

(65) Prior Publication Data
US 2018/0022168 A1 Jan. 25, 2018

(30) Foreign Application Priority Data
Jan. 28, 2015 (GB) .................................. 1501396.4

(51) Int. Cl.
*B60C 23/00* (2006.01)
(52) U.S. Cl.
CPC ................................ *B60C 23/003* (2013.01)

(58) Field of Classification Search
CPC .................................................... B60C 23/003
See application file for complete search history.

(56) References Cited

U.S. PATENT DOCUMENTS

| 6,394,159 | B1 | 5/2002 | Cobb |
| 6,425,427 | B1 | 7/2002 | Stech |
| 8,052,400 | B2 * | 11/2011 | Isono ..................... B60C 23/003 |
| | | | 152/417 |
| 9,573,428 | B2 * | 2/2017 | Sidders ................. F16K 15/025 |
| 9,878,586 | B2 * | 1/2018 | Laanemets ............ B60C 23/003 |

(Continued)

FOREIGN PATENT DOCUMENTS

| JP | 2000255228 A | * | 9/2000 | ........... B60C 23/003 |
| JP | 2006298197 A | * | 11/2006 | ........... B60C 23/003 |

(Continued)

OTHER PUBLICATIONS

Combined Search and Examination Report for application No. GB1501396.4, dated Jul. 10, 2015, 7 pages.

(Continued)

*Primary Examiner* — Kip T Kotter
(74) *Attorney, Agent, or Firm* — Reising Ethington P.C.

(57) ABSTRACT

A control valve assembly that includes: an inlet for receiving compressed air from a supply line; an outlet for supplying compressed air to a transfer line; and a control valve for selectively placing the inlet in fluid communication with the outlet. The control valve assembly is configured to be removably disposed in a wheel hub. In addition, the control valve has a filter for filtering air moving between the supply line and the transfer line.

6 Claims, 21 Drawing Sheets

(56) References Cited

U.S. PATENT DOCUMENTS

| | | | |
|---|---|---|---|
| 2002/0170597 A1* | 11/2002 | Colussi | B60C 23/003 137/226 |
| 2004/0055291 A1 | 3/2004 | Meydieu et al. | |
| 2005/0205182 A1* | 9/2005 | Maquaire | B60C 23/003 152/417 |
| 2005/0236083 A1 | 10/2005 | Wang et al. | |
| 2010/0038004 A1* | 2/2010 | Saadat | B60B 1/08 152/427 |
| 2011/0162734 A1* | 7/2011 | Colussi | F16K 11/105 137/544 |
| 2012/0138202 A1* | 6/2012 | Resare | B60C 23/003 152/427 |
| 2016/0199768 A1* | 7/2016 | Dunning | B60C 23/00 152/416 |

FOREIGN PATENT DOCUMENTS

| | | |
|---|---|---|
| WO | WO9952722 A1 | 10/1999 |
| WO | WO2014043157 A1 | 3/2014 |

OTHER PUBLICATIONS

International Search Report for International Application No. PCT/EP2016/051814, dated Jul. 11, 2016, 6 pages.
Written Opinion for International Application No. PCT/EP2016/051814, dated Jul. 11, 2016, 8 pages.

* cited by examiner

VEHICLE WHEEL ASSEMBLY

TECHNICAL FIELD

The present disclosure relates to a vehicle wheel assembly and in particular, but not exclusively, to a vehicle wheel assembly for delivering compressed air from a vehicle axle to a tire. Aspects of the present invention relate to a vehicle wheel; to a control valve assembly; to a central tire inflation system (CTIS); and to a vehicle.

BACKGROUND

The present invention was conceived in the context of central tire inflation systems (CTIS). CTIS were originally developed for military applications, in particular off-road military wheeled trucks and trailers. However, CTIS are nowadays incorporated into non-military vehicles such as specialist construction, agricultural and commercial vehicles.

CTIS comprise one or more compressed air sources located on-board the vehicle in fluid communication with one or more tires. Tire pressure can therefore be adjusted by the CTIS. Typically, CTIS provide for delivery of compressed air to a tire through a hose connected to the wheel and in some cases, this is integrated into a vehicle axle. Accordingly, there are vehicle wheels and vehicle wheel assemblies designed to receive incoming flow of compressed air from the axle, and to deliver it to the tire.

U.S. Pat. No. 6,425,427 B1 discloses an on-axle tire inflation system.

US 2005/0236083 A1 discloses a vehicle wheel assembly comprising a rim secured to a wheel hub and a tire secured to the rim, with a hollow stud having an air conduit. The hollow stud extends through a rim opening and has a first end secured to the hub. A lug nut is secured to the hollow stud at a second end. The first end is operably connected to a source of compressed air through the air conduit. A central tire inflation valve is secured to the rim. The rim includes a first internal conduit communicating with the air conduit and the valve, and a second internal conduit communicating with the valve and the interior of the tire.

Drawbacks of the known systems include their adverse effect on wheel styling (which is not typically a concern with trucks but may not be aesthetically acceptable for passenger vehicles), their bulkiness and heaviness.

It is an object of the present invention to further improve on central tire inflation systems.

SUMMARY OF THE INVENTION

Aspects and embodiments of the invention provide a control valve assembly, a vehicle wheel, a wheel assembly, a Central Tire Inflation System (CTIS) and a vehicle as claimed in the appended claims.

According to an aspect, there is provided a control valve assembly comprising; an inlet for receiving compressed air from a supply line; an outlet for supplying compressed air to a transfer line; and a control valve for selectively placing the inlet in fluid communication with the outlet; wherein the control valve assembly is configured to be removably disposed in a wheel hub; and wherein the control valve includes a filter for filtering air moving between the supply line and the transfer line. The working life of the control valve may be extended by preventing foreign objects typically present in compressed air from entering and moving through the control valve assembly.

The inlet may comprise a mounting formation and wherein the filter may include a supply line filter supported by the mounting formation, wherein the supply line filter is arranged to filter air moving between the control valve and the supply line.

The supply line filter may be "top-hat" shaped extending upstream. The "top-hat" shape provides two functions; first maximizing surface area contacting the supply line air flow, and secondly to minimize clogging of the filter. Any dirt will collect at the downstream annulus of the top-hat leaving the upstream disc free from dirt.

Alternatively, the supply line filter may be a disc oriented diagonally to air entering from the supply line.

The mounting formation may be formed integrally with the supply line filter as a substantially monolithic structure.

The mounting formation may be removably and replaceably mounted to the inlet. In this way, the supply line filter can be cleaned without removal of the entire control valve assembly. In addition, if the supply line filter, or elsewhere on the mounting formation, is damaged, the mounting formation can be replaced easily without removing the control valve assembly.

The mounting formation may comprise one or more finger grips. Finger grips aid with removal by hand of the mounting formation, should it become damaged or should the filter require cleaning.

The control valve assembly may comprise an annular cage removably and replaceably mounted around the control valve, wherein the filter may comprise a transfer line filter arranged to filter air moving between the control valve and the transfer line, wherein the annular cage may support the transfer line filter. The transfer line filter can thus easily be replaced or serviced during life of the control valve assembly.

The annular cage may comprise a plurality of axial spokes having a plurality of transfer line filters therebetween. More than one filter provides improved maintainability since individual filters can be replaced when they become clogged. In addition, material wastage is reduced since if a group of filters becomes clogged; those filters can be replaced leaving the unclogged filter free for re-use.

According to a further aspect, there is provided, a control valve assembly comprising; an inlet for receiving compressed air from a supply line; an outlet for supplying compressed air to a transfer line; and a control valve for selectively placing the inlet in fluid communication with the outlet; wherein the control valve assembly is configured to be removably disposed in a wheel hub; and wherein the control valve assembly comprises a compliant ring for engaging the wheel hub.

Compliant materials have good vibrational absorption properties for isolating the control valve assembly from the wheel hub.

The compliant material may be an elastomeric material.

According to a further aspect, there is provide a vehicle wheel comprising; a wheel hub for mounting the wheel to a vehicle; wheel rim for mounting a tire on the wheel, and a transfer line for supporting compressed air to a tire if the tire is mounted on the wheel; wherein said wheel hub comprises a mounting structure to receive removably a control valve assembly; and wherein the wheel hub comprises a sacrificial lip extending radially inwardly relative to the mounting structure, said sacrificial lip for supporting the wheel during off-vehicle wheel operations.

Oftentimes, when performing off-vehicle maintenance or repair, such as tire replacement, a wheel may be dismounted from the vehicle and mounted onto a rotating shaft or arm of a wheel balancing machine or similar device. The sacrificial lip extending inwardly more than the mounting structure ensures that any accidental damage or localized wear caused by mounting and dismounting of the wheel during service and maintenance operations does not affect any surfaces of the wheel associated with the valve assembly. With the sacrificial lip extending inwardly, any damage or wear that occurs will be suffered by this sacrificial element, protecting the mounting structure. Since the lip is sacrificial, the wheel can still be used in the event that the lip does become damaged.

According to a further aspect, there is provided a vehicle wheel assembly for supplying compressed air to a tire, the vehicle wheel assembly comprising a wheel and a control valve assembly, the wheel comprising: a wheel hub for mounting the wheel to a vehicle; a wheel rim for mounting a tire on the wheel; and a transfer line for supplying compressed air to a tire mounted on the wheel; the control valve assembly comprising; an inlet for receiving compressed air from a supply line; an outlet for supplying compressed air to the transfer line; and a control valve for selectively placing the inlet in fluid communication with the outlet; and wherein the vehicle wheel assembly comprises a locking mechanism to lock removably the control valve assembly within the wheel hub.

The locking mechanism reduces the risk of untimely removal of the control valve assembly.

The locking mechanism may comprise a twist lock. A twist lock is easy to operate by hand.

The vehicle wheel assembly may comprise an alignment element to limit fitting of the control valve assembly to the wheel to a single orientation. In this way, the control valve assembly will not be installed on the wheel in an incorrect orientation where the outlet is not aligned with the transfer line.

The vehicle wheel assembly may comprise a grip for aiding installation of the control valve assembly by hand. Advantageously, no tooling is required to install or remove the control valve assembly when implementing the grip.

The grip may include an axially extending continuous wall comprising five circumferentially spaced peaks and troughs, each trough for receiving a finger or thumb of a user. Providing space for the fingers and thumb improves the gripping capability of a user installing or removing the control valve assembly. Accordingly, the need for any tooling to help install or remove the control valve assembly is eliminated.

The wheel of the vehicle wheel assembly may be any of the aforementioned wheels.

The control valve assembly of the vehicle wheel assembly may be any of the aforementioned control valve assemblies.

According to a further aspect, there is provided a Central Tire Inflation System (CTIS) comprising any of the aforementioned vehicle wheel assemblies.

According to a further aspect, there is provided a vehicle comprising the aforementioned CTIS.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
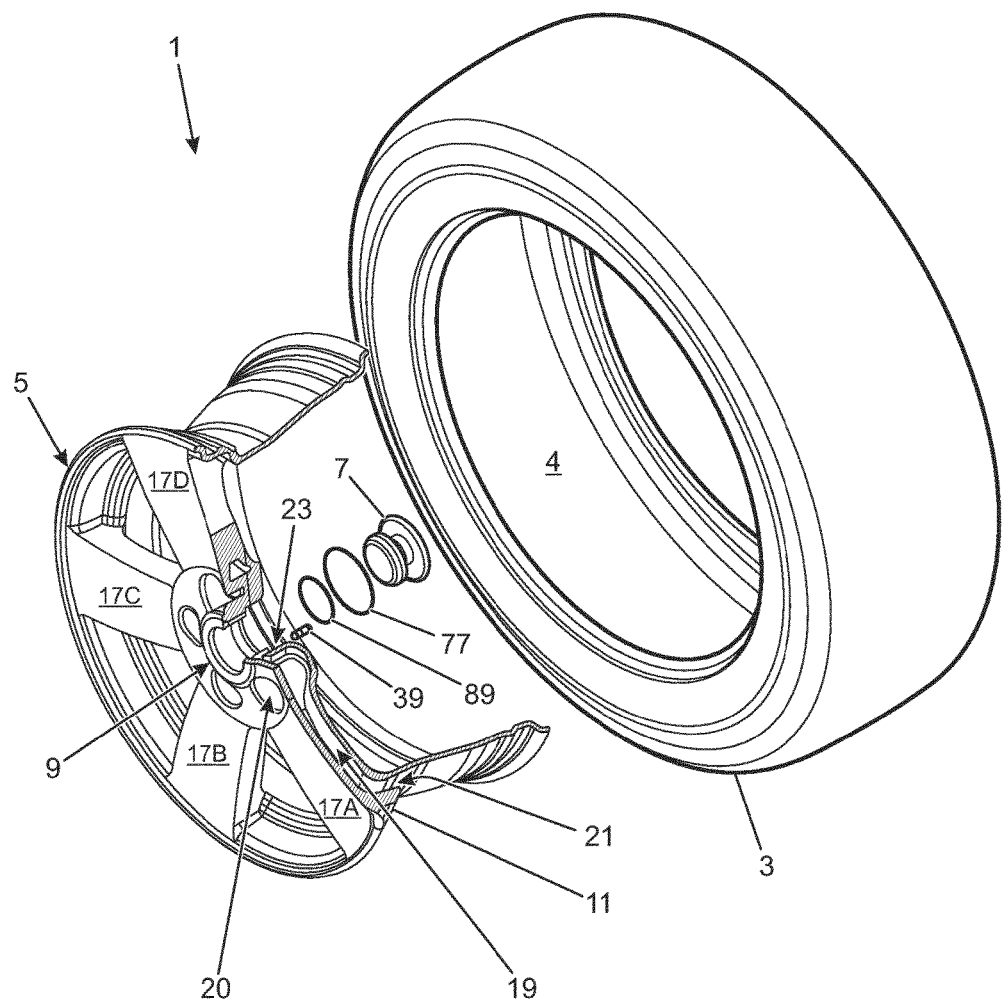
FIG. 1 is an exploded perspective view of a vehicle wheel assembly.

A vehicle wheel assembly 1 in accordance with an embodiment of the present invention for application in a motor vehicle V will now be described with reference to the accompanying Figures. The vehicle wheel assembly 1 forms part of a central tire inflation system (CTIS) for controlling the pressure of a tire 3. The vehicle wheel assembly 1 can be implemented in a range of motor vehicles, including cars, off-road vehicles, sports utility vehicles (SUVs), trucks, buses and so on.

The vehicle wheel assembly 1 comprises a wheel 5 and a control valve assembly 7. The wheel 5 comprises a wheel hub 9, a wheel rim 11 and a plurality of spokes 17A-F (two of the spokes 17E and 17F have not been shown for clarity) which connect the wheel rim 11 to the wheel hub 9. The tire 3 locates on the wheel rim 11 in conventional manner. The control valve assembly 7 is removably disposed within the wheel hub 9 and is in fluid communication with a compressed air supply in the form of a compressor C and/or a reservoir (not shown) provided on the vehicle. In the present embodiment, fluid communication with the compressed air supply is established through a supply line 13 extending along a central axis of a drive shaft 15 (both shown schematically in FIG. 6). In use, the control valve assembly 7 is operable selectively to open and close the fluid connection between the supply line 13 and the tire 3.

In the example shown in the figures, the wheel 5 is made of a cast metallic alloy, such as aluminum or magnesium, and is of a type generally used in automotive vehicles. The wheel 5 has six spokes 17A-F, but can have less than or more than six spokes 17. A first spoke 17A is hollow and comprises a transfer line 19 extending radially outwardly from the wheel hub 9 to the rim 11. A first end of the transfer line 19 communicates with a radially outer opening 21 disposed on the rim 11 and through which the tire can be inflated/deflated; and a second end of the transfer line 19 communicates with a radially inner opening 23 disposed on the wheel hub 9. The radially outer opening 21 opens into an interior of the tire 3 such that a fluid pathway is established between the supply line 13 and the interior of the tire 3. The transfer line 19 could be machined in the first spoke 17A, but in the present embodiment it is formed during the casting process. The other spokes 17B-F can also be hollow to help balance the wheel assembly 1.

Figure 2:
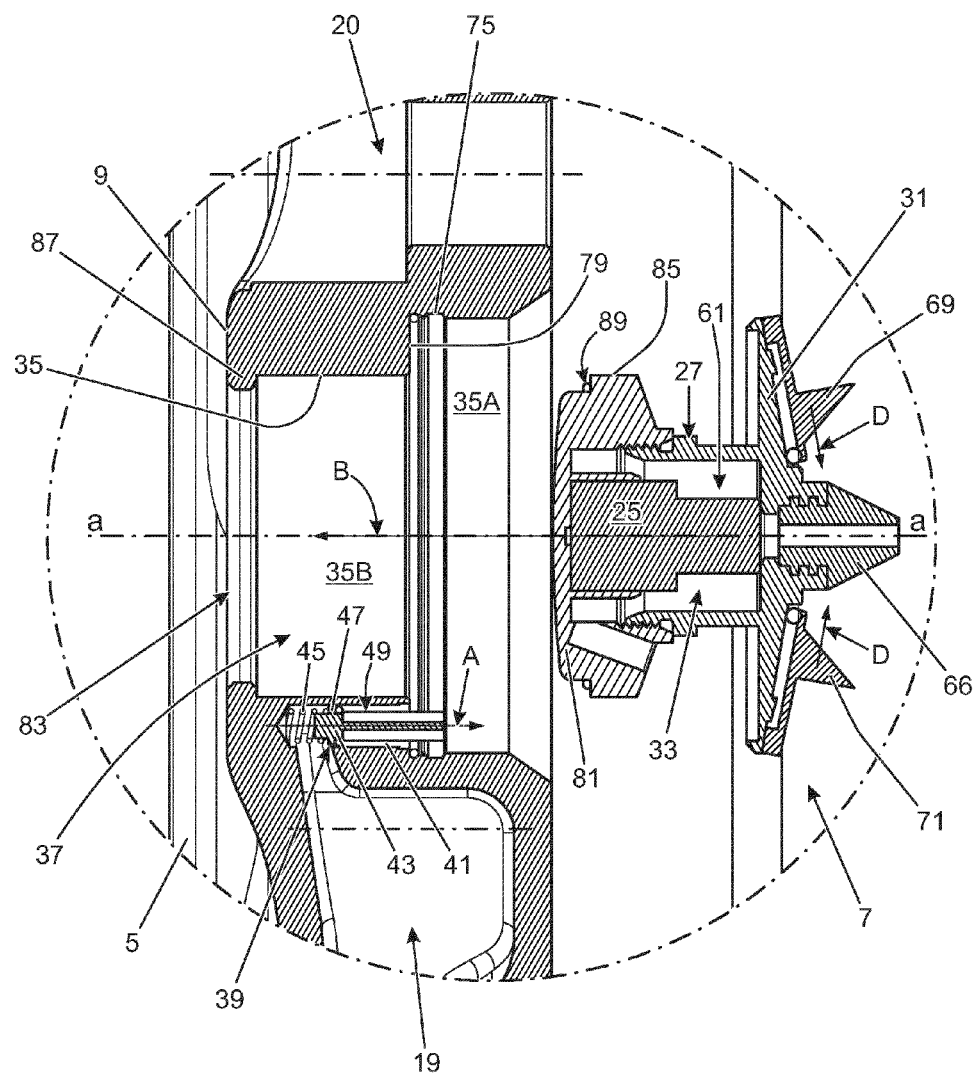
FIG. 2 is a sectional view of the wheel hub with a control valve assembly shown in withdrawn position relative to the wheel hub.
Figure 3:
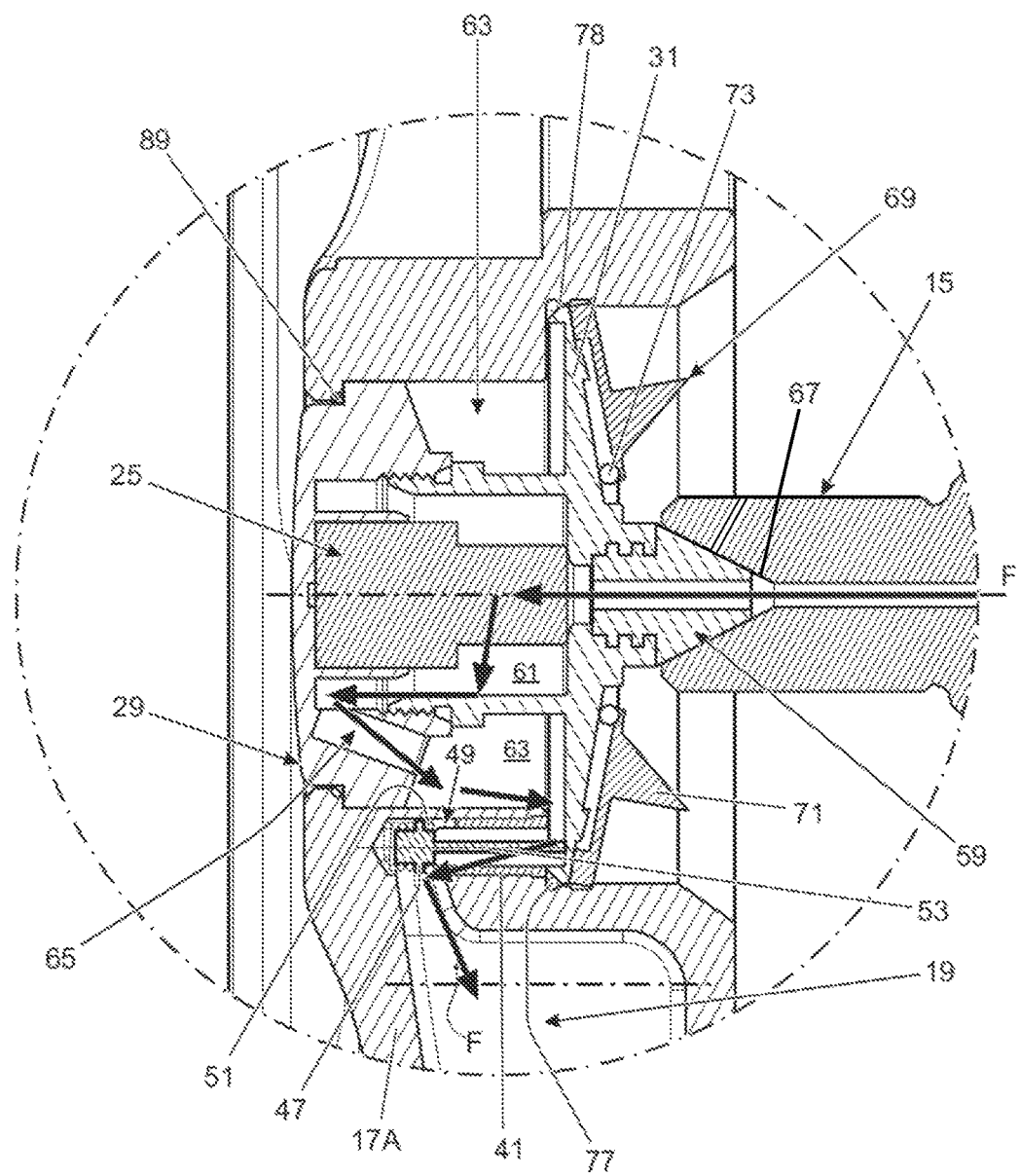
FIG. 3 is a cross sectional view of the wheel hub with the control valve assembly installed.

The control valve assembly 7 comprises a control valve 25 mounted in a housing 27. FIGS. 2 and 3 show in detail the housing 27, which housing 27 comprises a base member 29 and a closure member 31 which are threadedly connected to form a valve chamber 33 in which the control valve 25 is located, as shown in FIG. 2. The wheel hub 9 is adapted to receive the control valve assembly 7. Specifically, the wheel hub 9 comprises a stepped cylindrical sidewall 35, arranged co-axially with a rotational axis a-a of the wheel 5, which forms a central cavity 37 in which the control valve assembly 7 is removably mounted. As described herein, the wheel assembly 1 is assembled by locating the control valve assembly 7 in the central cavity 37. The wheel assembly 1 can then be mounted to the vehicle V in conventional manner by means of threaded studs and nuts or wheel bolts (not shown) fixedly mounted to a vehicle hub (not shown). The bolts extend through bores 20 formed in the wheel hub 9 and the wheel assembly 1 is secured by e.g. wheel nuts, as appropriate. In use, the control valve assembly 7 is fixedly mounted in position between the wheel hub 9 and the vehicle hub.

A wheel valve 39 is provided for sealingly closing the transfer line 19 in the first spoke 17A when the control valve assembly 7 is removed from the wheel hub 9. In the present embodiment, the wheel valve 39 is disposed at the radially inner opening 23 of the transfer line 19, but it could be disposed along the length of the transfer line 19 or at the radially outer opening 21. The wheel valve 39 comprises a fixed sleeve 41, a movable valve member 43, and a resilient biasing means in the form of a coil spring 45. The valve member 43 has a valve head 47 for cooperating with a valve seat 49 formed in the sleeve 41. The valve member 43 is movable between a closed position (shown in FIG. 2) in which the valve head 47 is seated in the valve seat 49; and an open position (shown in FIG. 3) in which the valve head 47 is spaced apart from the valve seat 49 (i.e. unseated). The valve member 43 is movable along an axis arranged substantially parallel to the central rotational axis a-a of the wheel 5 to minimize operational loads, for example centripetal forces as the wheel 5 rotates.

A first O-ring 51 is provided around the valve head 47 for forming a seal between the valve seat 49 and the valve member 43. When the valve member 43 is in its closed position, the wheel valve 39 is closed and the supply of air to the tire 3 and/or the exhausting of air from the tire 3 through the transfer line 19 formed in the first spoke 17A is inhibited. The spring 45 biases the valve member 43 towards its closed position, as illustrated by a first arrow A shown in FIG. 2.

Displacement means in the form of a pin 53 is coupled to the valve head 47 to cooperate with the control valve assembly 7 and displace the valve member 43 to its open position. Specifically, when the control valve assembly 7 is mounted in the wheel hub 9, the closure member 31 engages the pin 53 and displaces the valve member 43 to its open position, as shown in FIG. 3. When the valve member 43 is in its open position, the wheel valve 39 is open and the supply of air to the tire 3 and/or the exhausting of air from the tire 3 through the first spoke 17A is permitted. The direction of flow through the valve member 43 is dependent on the relative pressures in the supply line 13 and the tire 3. It will be appreciated that fluid communication between the control valve assembly 7 and an interior of the tire 3 is established when the control valve assembly 7 is mounted to the wheel hub 9.

In the present embodiment, the control valve 25 is a pneumatic latching valve which can be selectively opened and closed in response to the application of control pressures. The control valve 25 has an axial inlet port 55 and a radial outlet port 57. A frusto-conical nozzle 59 is mounted to the inlet port 55 (shown in FIGS. 4A-D) for sealingly engaging the drive shaft 15 and establishing fluid connection with the supply line 13. The outlet port 57 is in fluid communication with the transfer line 19 formed in the first spoke 17A via the wheel valve 39. The control valve 25 can be selectively opened and closed to control the flow of compressed air between the inlet port 55 and the outlet port 57. The operation of the control valve 25 is described in more detail herein with reference to FIGS. 4A to 4D.

The control valve 25 is disposed centrally within the valve chamber 33 formed by the base member 29 and the closure member 31. A first annular chamber 61 is formed within the housing 27, extending circumferentially around the control valve 25 to maintain fluid communication with the outlet port 57 irrespective of the angular orientation of the control valve 25. A second annular chamber 63 is formed between the housing 27 and the wheel hub 9 to ensure that fluid communication with the transfer line 19 in the first spoke 17A is maintained irrespective of the angular orientation of the control valve assembly 7. The first and second annular chambers 61, 63 are arranged concentrically about the rotational axis a-a in the present embodiment. An offset bore 65 is formed in the base member 29 to establish fluid communication between the first and second annular chambers 61, 63. The wheel valve 39 opens into the second annular chamber 63, thereby establishing fluid communication between the supply line 13 and the first spoke 17A when the wheel valve 39 and the control valve 25 are open.

The nozzle 59 is formed from a resilient material, such as rubber, and has a frusto-conical outer surface 66 for sealingly engaging a cooperating inner surface 67 formed in the drive shaft 15. Said drive shaft inner surface could be cylindrical and could comprises a thread for engagement with a corresponding thread provided on a corresponding cylindrical outer surface of a stub axle fluid connector. This stub axle fluid connector can be substantially in the form of a bolt having a head configured to engage with the frusto-conical outer surface 66 of the nozzle 59. Said fluid connector can therefore threadedly engage with the cylindrical drive shaft inner surface at one end. At the other end, the fluid connector can receive the frusto-conical outer surface 66 of the nozzle 59 by means of a frusto-conical passageway formed in the head.

A pair of retaining clips 69, 71 is mounted to the closure member 31 for releasably fixing the control valve assembly 7 within the wheel hub 9. A spring 73 is provided to bias the clips 69, 71 radially outwardly to engage a first annular recess 75 formed in the cylindrical sidewall 35 of the hub 9. A second O-ring 77 is provided for forming a seal between the closure member 31 and the wheel hub 9. The second O-ring 77 locates in a second annular recess 78 formed in the cylindrical sidewall 35.

The control valve assembly 7 is removably mounted in the hub cavity 37 from an inside of the vehicle wheel assembly 1, as illustrated by a second arrow B in FIG. 2. A longitudinal axis of the control valve assembly 7 is arranged coaxially with the rotational axis a-a of the wheel 5. The cylindrical sidewall 35 comprises an inner cylindrical section 35A for accommodating the closure member 31 and an outer cylindrical section 35B for accommodating the base member 29. The inner and outer cylindrical sections 35A, 35B are arranged co-axially and offset relative to each other along said axis. The inner cylindrical section 35A has a larger diameter than the outer cylindrical section 35B. Further, the inner and outer cylindrical sections 35A, 35B share the same centerline, which corresponds, in this example, to the centerline of the wheel and the wheel hub, that is to say, the axis of rotation of the wheel. A radial surface 79 is formed in the cylindrical sidewall 35 to delimit the inner and outer cylindrical sections 35A, 35B.

A circular locating member 81 disposed at the end of the base member 29 locates in a circular aperture 83 formed in the hub 9. The locating member 81 extends through the hub 9 to the outer side of the wheel assembly 1. An annular flange 85, formed around the circular locating member 81, cooperates with an axial retaining means in the form an annular projection 87 formed in the wheel hub 9. A third O-ring 89 is mounted to the base member 29 to form a seal between the annular flange 85 and the annular projection 87.

The control valve assembly 7 is removably mounted within the hub cavity 37. When the control valve assembly 7 is located in the wheel hub 9, the locating member 81 is disposed within the circular aperture 83. When installed at a prescribed axial location within the wheel hub 9, the closure member 31 engages the pin 53 of the wheel valve 39, thereby displacing the valve member 43 to its open position. The annular flange 85 and third O-ring 89 abut the annular projection 87 and the closure member 31 and the second O-ring 77 abut the radial surface 79 formed in the wheel hub 9. The second and third O-rings 77, 89 form seals between the wheel hub 9 and the closure member 31 and the base member 29 respectively. The first and second annular chambers 61, 63 are thereby sealed when the valve control assembly 7 is located in the wheel hub 9. The clips 69, 71 locate in the first annular recess 75 formed in the wheel hub 9 to retain the control valve assembly 7 in position. The clips 69, 71 can be displaced radially inwardly to release the control valve assembly 7, as shown by arrows D in FIG. 2.

The fluid pathway through the control valve assembly 7 and the wheel 5 during tire inflation will now be described with reference to FIGS. 3 and 4A to 4D. The fluid pathway is illustrated by a sequence of solid lines with arrows denoted generally by reference F. The compressed air is supplied through the supply line 13 and enters the control valve 25 through the inlet port 55. If the control valve 25 is closed, the flow of compressed air through the control valve 25 is inhibited. If the control valve 25 is open, the compressed air travels through the control valve 25 and exits through the outlet port 57 before entering the first and second annular chambers 61, 63.

The second annular chamber 63 is in fluid communication with the wheel valve 39. When the control valve assembly 7 is mounted in the wheel hub 9, the closure member engages the pin 53 and displaces the valve member 43 to its open position. The wheel valve 39 is thereby opened to establish fluid communication between the second annular chamber 63 and the cavity 4 of the tire 3 via the transfer line 19. The control valve 25 is operable to control the supply of compressed air between the supply line 13 and the tire 3.

To inflate the tire 3, the control valve 25 is opened by high pressure air supplied by the compressor C (or by an alternative compressed air reservoir) through the supply line 13. This step is represented by the raising pressure gradient at time t1 in FIG. 5. In particular, the control valve 25 is opened when the supply air pressure exceeds a predetermined threshold. When inflating, the supply air pressure is raised, the control valve 25 opens and air flows into the tire cavity 4 (interval between times t1 and t2 in FIG. 5). Once the air pressure inside the tire cavity 4 has reached the desired level (at time t2 in FIG. 5), the supply air pressure is momentarily dropped and then raised above the valve operation threshold briefly (i.e. between times t3 and t4 in FIG. 5, corresponding typically to a time interval of about 0.5 s) before returning to approximately ambient pressure (corresponding to time t4 in FIG. 5). The control valve 25 is thus closed and the tire cavity 4 is now sealed by the control valve 25.

Deflation requires the supply air pressure to be raised again, briefly, above the valve operation threshold to open the control valve 25 to allow air to leave the tire cavity 4. The control valve 25 then needs to be operated again, briefly, in the same manner, i.e. by applying a supply air pressure above the valve operation threshold to close the control valve 25 to seal the tire cavity 4. The pressure of air in the tire cavity 4 is measured by a tire pressure monitoring system (TPMS) sensor (not shown) mounted on the wheel rim 11.

Figure 6:
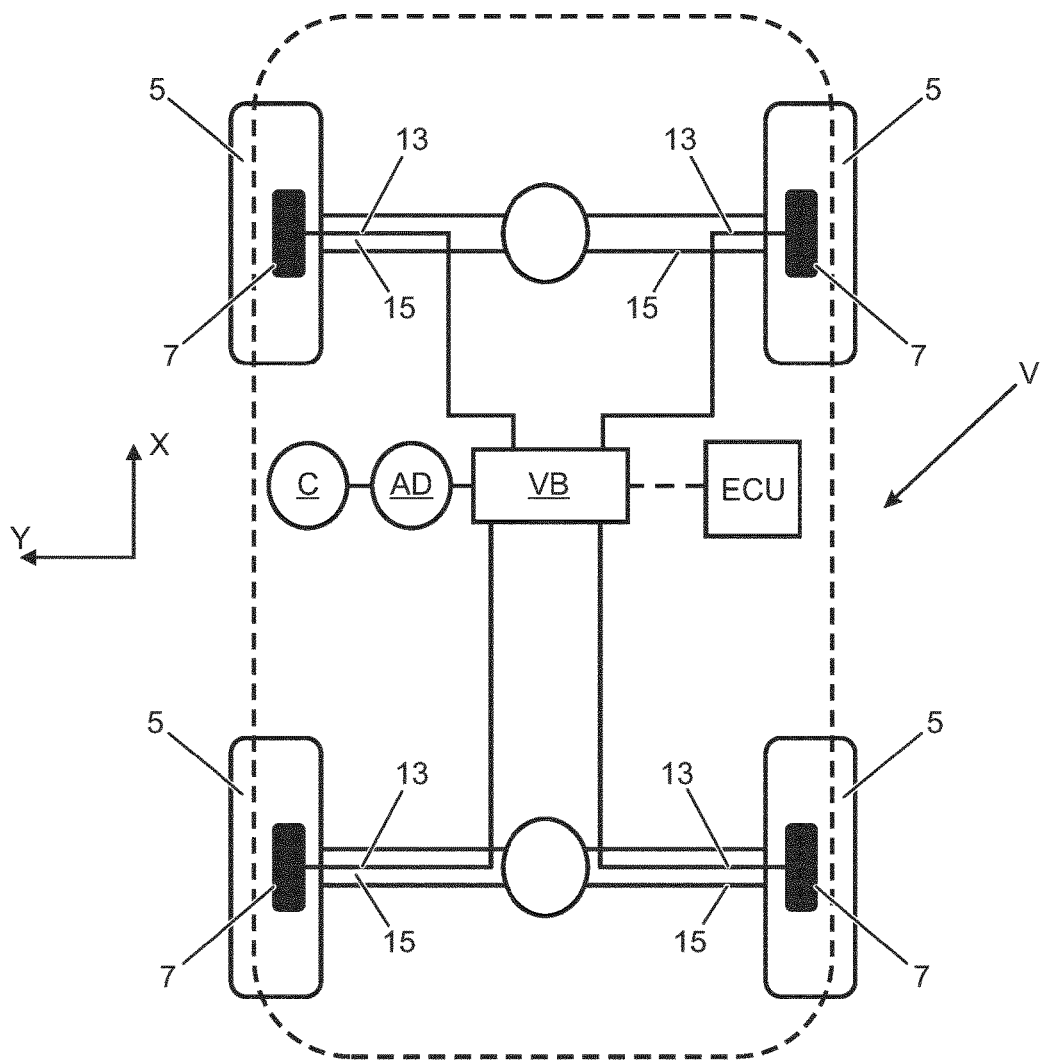
FIG. 6 is a schematic representation of a vehicle equipped with a central tire inflation system (CTIS) including the vehicle wheel assembly from FIG. 1.

As depicted in FIG. 6, the operation of compressor C can be controlled by valve block VB comprising solenoid valves (not shown) actuated by an electronic control unit (ECU). In the present embodiment, the ECU is configured to operate the valve block VB to control the opening and closing of the control valve 25 as described herein. An air dryer AD is provided between the compressor C and the valve block VB. The pressure in each wheel can be controlled independently, or the pressures of the two front wheels can be can be controlled together or the pressures of the four wheels (front and back) can be controlled together.

The operation of the control valve 25 will now be described in more detail with reference to the schematic representations shown in FIGS. 4A to 4D. The control valve 25 comprises valve means in the form of a poppet valve 84, a poppet spring 86 for loading the poppet valve 84, a piston assembly 88, a piston spring 90 loading the piston assembly 88 and a latch 91. The poppet valve 84 and the piston assembly 88 are arranged co-axially with the rotational axis a-a of the wheel 5 to reduce operational loads, for example centripetal forces caused by rotation of the wheel 5. The latch 91 comprises a rotary latching mechanism which sequentially rotates through first, second, third and fourth position to define different operating modes. The latch 91 is controlled by the air pressure at the inlet port 55. Thus, the supply line 13 functions as a control line for the control valve 25. The operating modes will now be described in sequence.

Figure 4A:
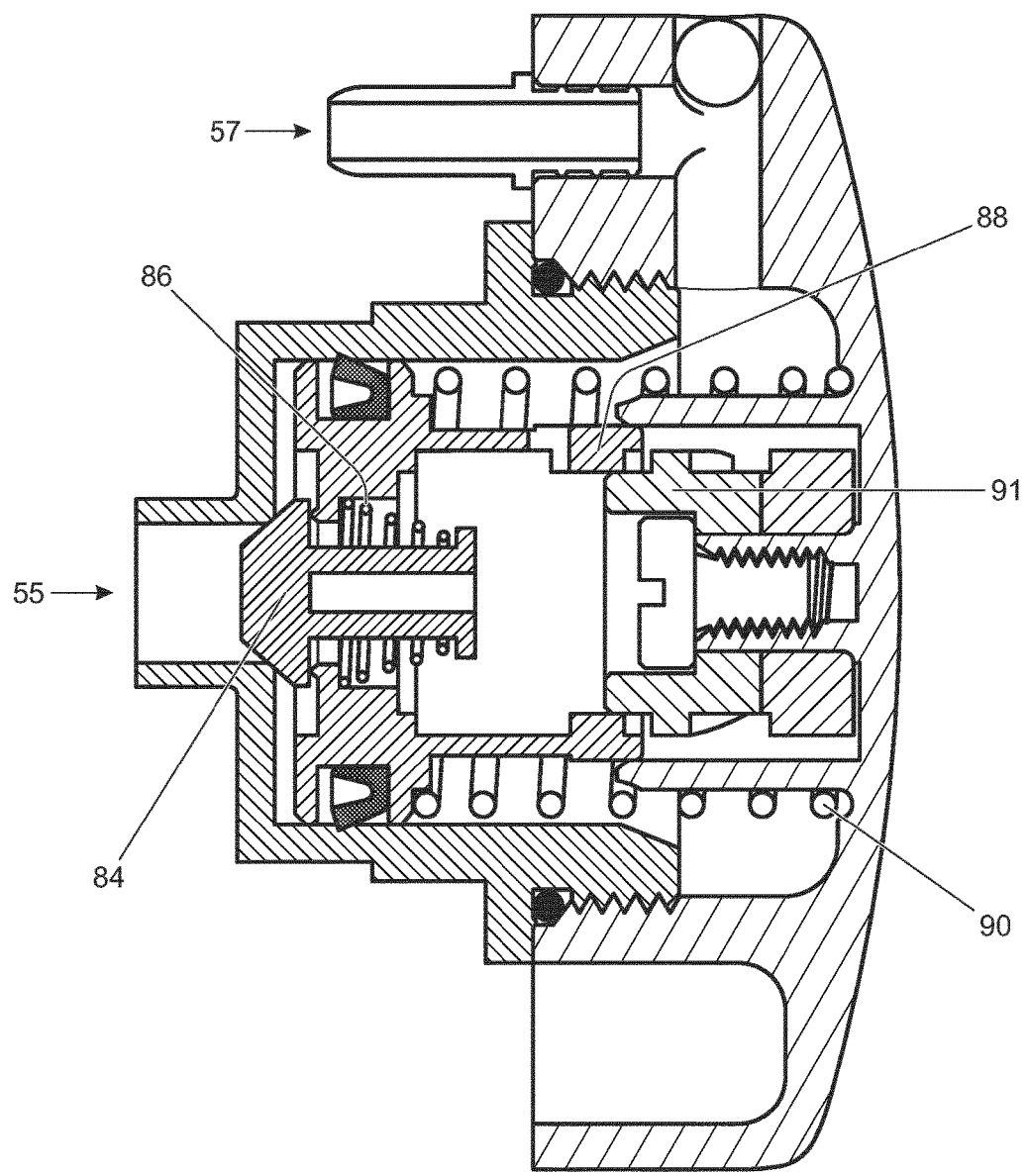
FIGS. 4A-D show schematic representations of a latching valve in the control valve assembly in different operating modes.

During a normal running mode, no compressed air is supplied to the supply line 13 and the pressure in the supply line 13 is substantially equal to, or slightly above, atmospheric pressure. The poppet valve 84 is displaced to its closed position (as shown in FIG. 4A) under the action of the poppet spring 86 and the fluid pressure from the tire side. The control valve 25 is closed, thereby maintaining the pressure of the tire 3. The latching mechanism is in a first position when the control valve 25 is operating in the normal running mode.

Figure 4B:
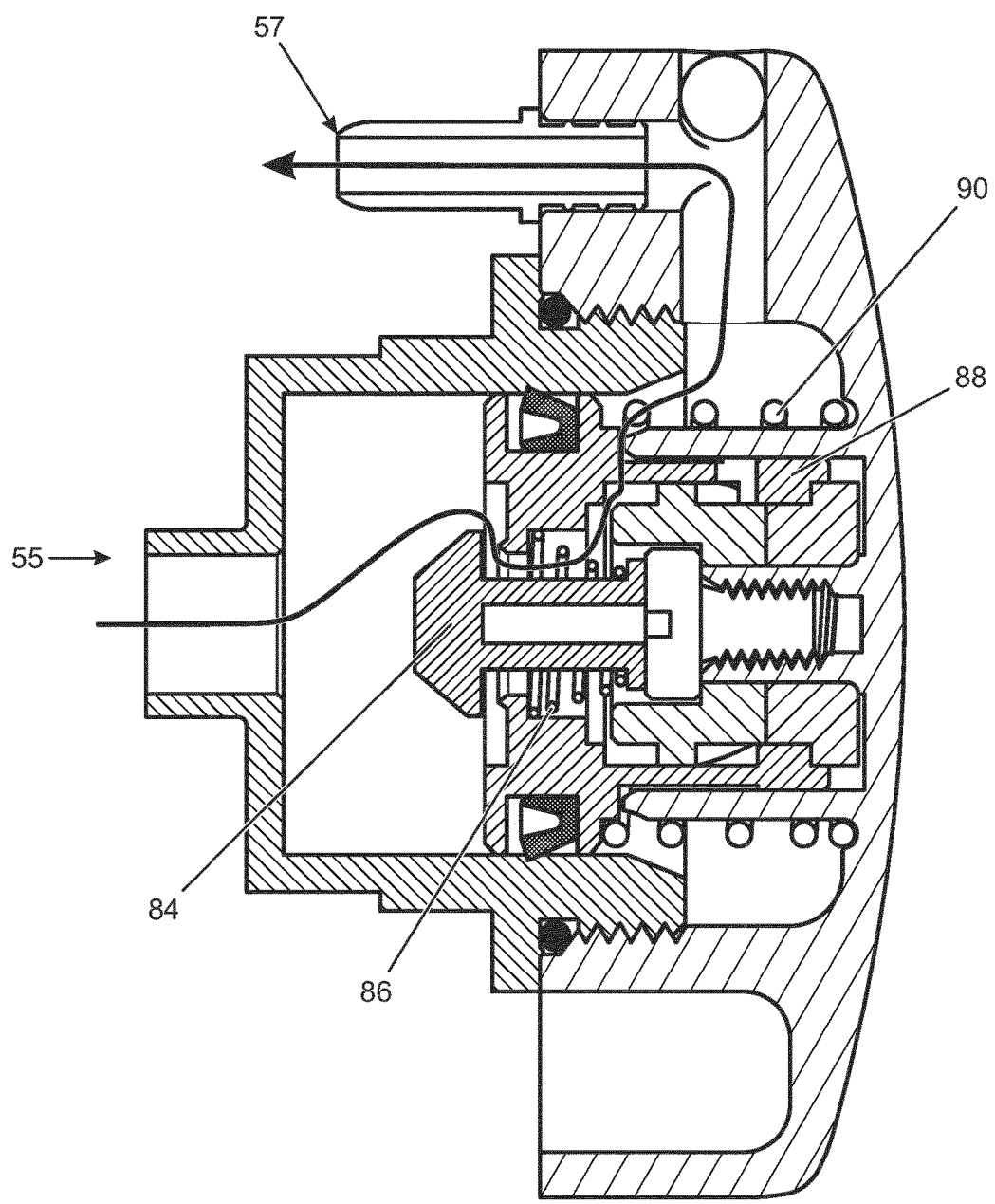
Figure 5:
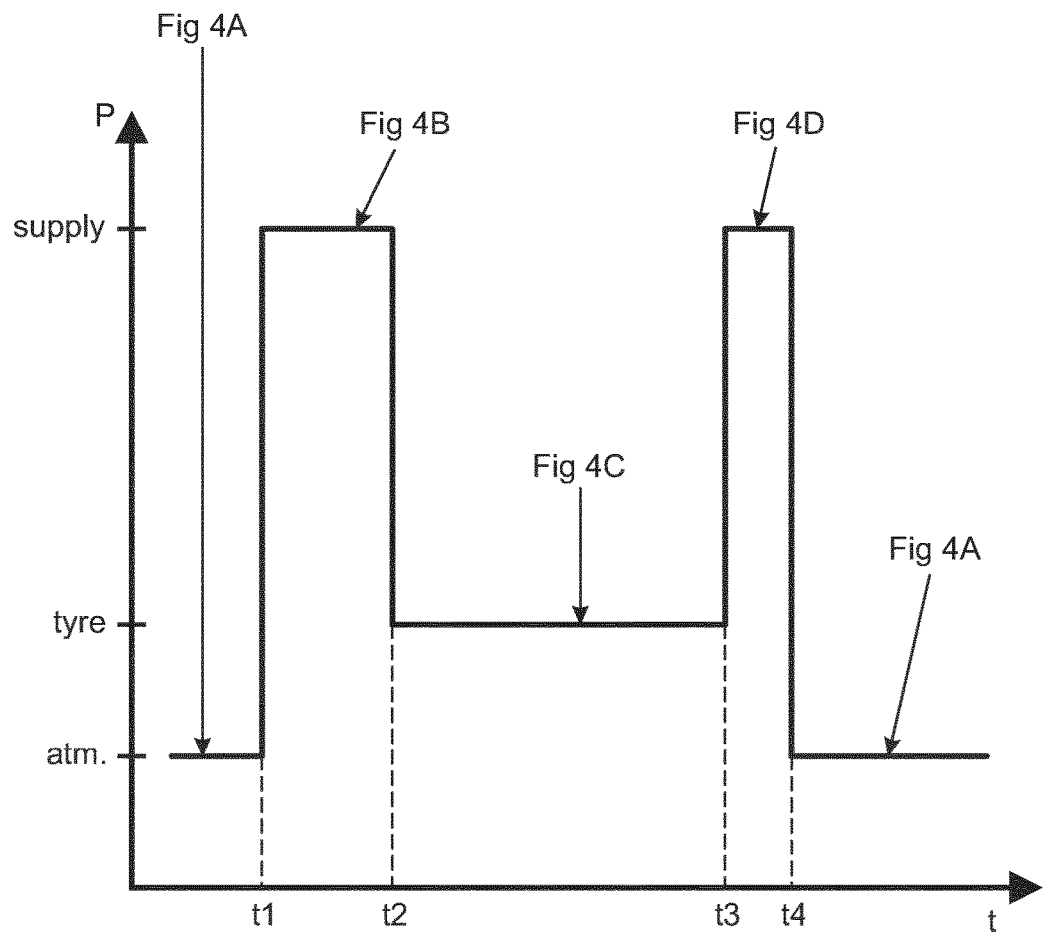
FIG. 5 shows a schematic air supply pressure against time diagram over a cycle of the control valve assembly shown in FIGS. 4A-D.

To operate in an inflate mode, full pressure is supplied to the inlet port 55 of the control valve 25. As shown in FIG. 4B, the piston assembly 88 is displaced against the action of the piston spring 90 (to the right in the illustrated arrangement). The displacement of the piston assembly 88 causes the poppet valve 84 to lift in relation to the piston assembly 88 allowing compressed air to flow through the control valve 25. The tire 3 can be inflated to a required pressure. The latch 91 rotates to a second position during the inflate mode. As shown in FIG. 5, after the tire pressure has been adjusted as desired, the poppet valve 84 must be operated again, by supplying full pressure, in order to close the control valve 25, so that the tire cavity 4 remains sealed.

Figure 4C:
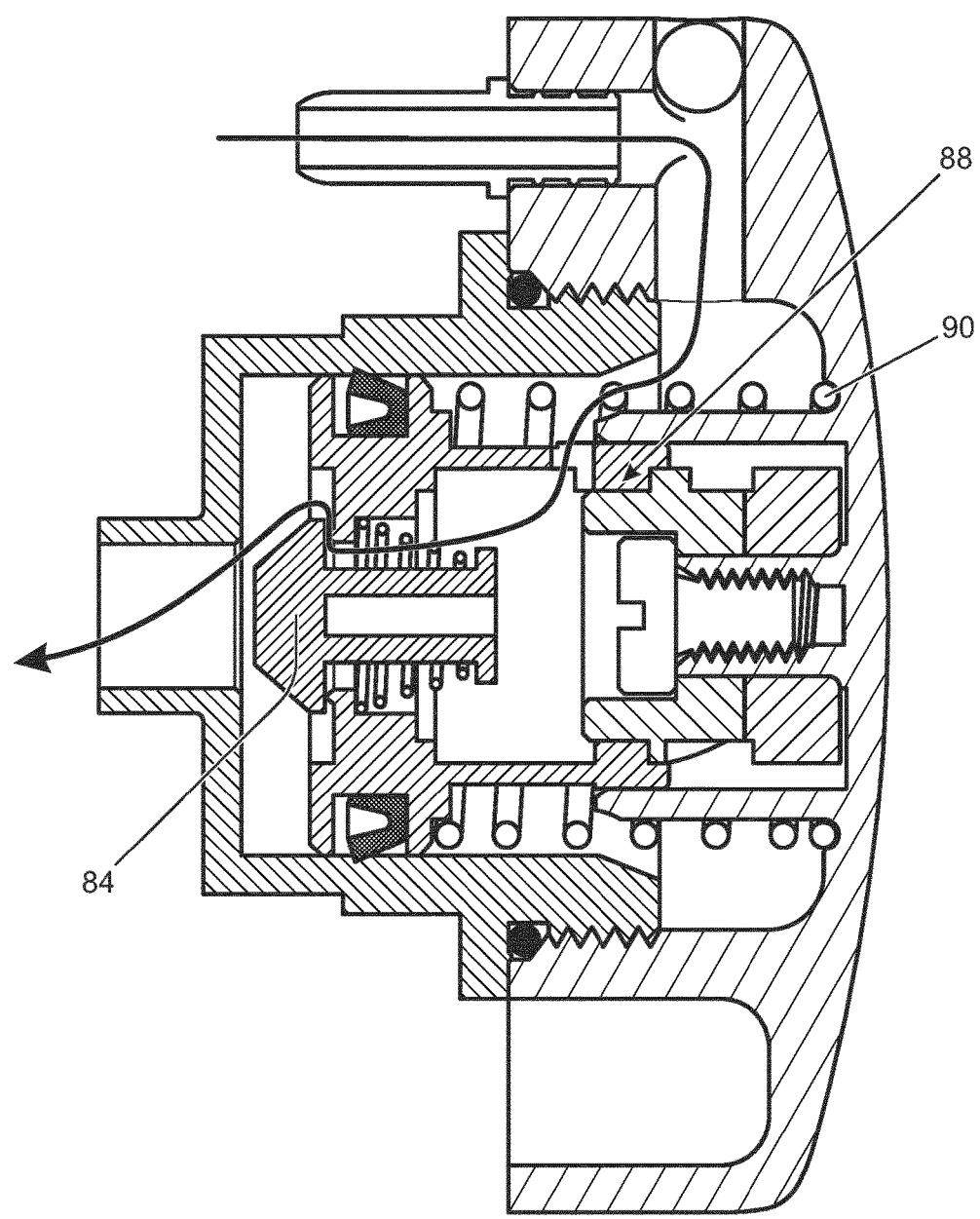
Figure 4D:
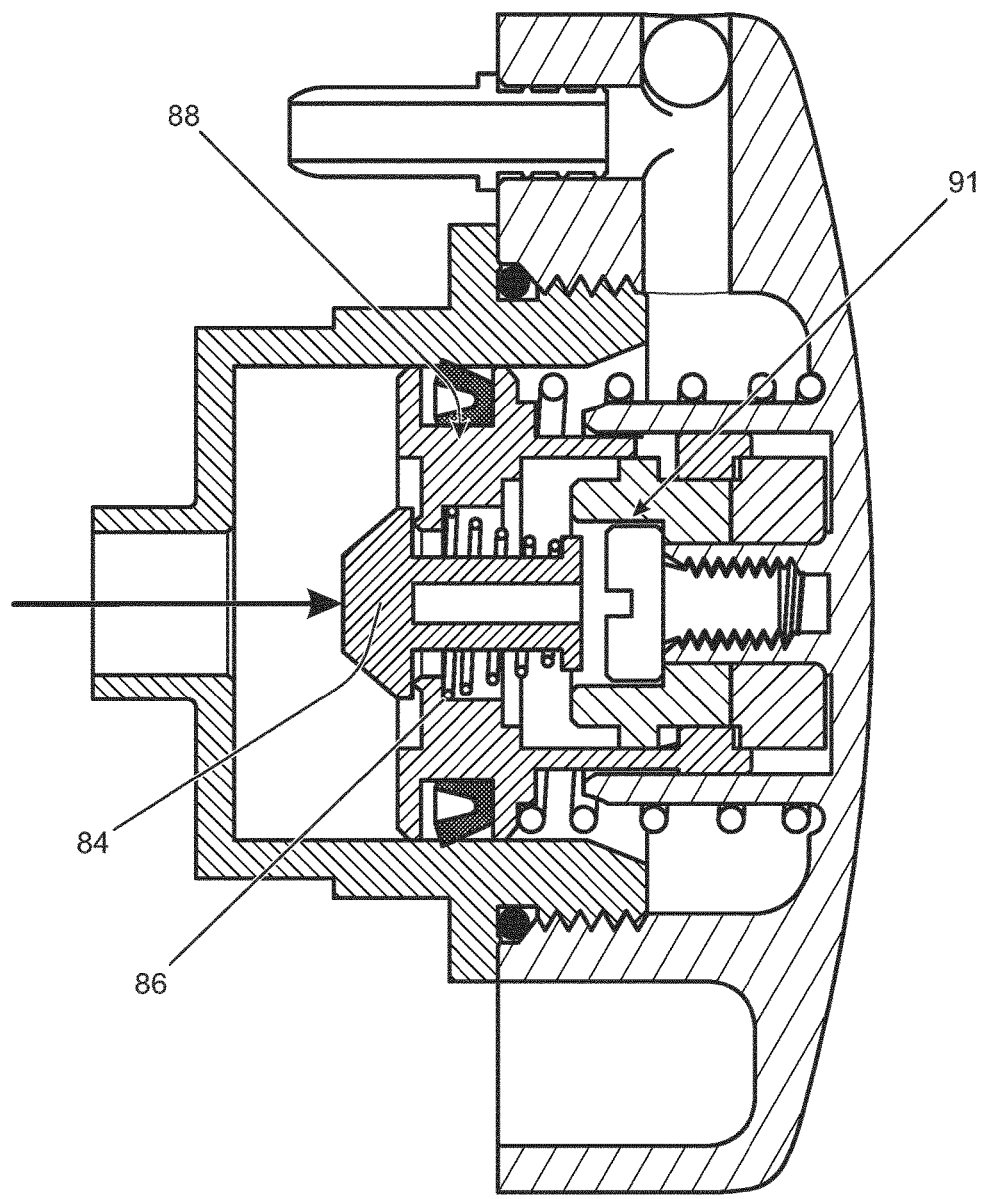

To operate in a deflate/pressure check mode, the poppet valve 84 must be operated again in the same manner, i.e. by supplying full pressure, and then the pressure supplied to the inlet port 55 is reduced to tire pressure or below. The piston assembly 88 moves under the action of the piston spring 90 (to the left in the illustrated arrangement), but is stopped by the latch 91 and held in an intermediate position, as shown in FIG. 4C. The poppet valve 83 can readily be opened by tire pressure so the pressure in the tire 3 can be reduced, if desired. If the supply line 13 is closed, the tire pressure can be measured. The latch 91 rotates to its third position when the deflate/pressure check mode is engaged.

To reset the control valve 25, again full pressure is applied to the inlet port 55 and the piston assembly 88 is displaced against the action of the piston spring 90 (to the right in the illustrated arrangement). However, the piston assembly 88 is stopped by the latch 91 and the poppet valve 84 is prevented from lifting from the piston assembly 88. The control valve 25 thereby remains closed throughout the reset operation and the tire pressure does not change. Finally, the latch 91 rotates to its fourth position in preparation for returning to the normal run mode.

As described herein, the control valve assembly 7 is removably mounted in the hub cavity 37. When the vehicle wheel assembly 1 is installed on the vehicle, the control valve assembly 7 is fixed in position between the wheel hub 9 and the vehicle hub so that it rotates with the wheel when the vehicle in in motion. The control valve assembly 7 can only be removed once the vehicle wheel assembly 1 has been removed. In particular, the vehicle wheel assembly 1 is removed from the vehicle hub by undoing the wheel nuts (or bolts) and lifting the entire wheel assembly 1 off of the mounting bolts. The retaining clips 69, 71 are then squeezed together and released from the first annular recess 75 to enable the control valve assembly 7 to be removed from the wheel hub 9. The control valve assembly 7 is removed axially, along the rotational axis a-a towards the inner side of the vehicle wheel assembly 1. When the control valve assembly 7 is removed, the closure member 31 is lifted clear of the pin 53 and the valve member 43 is displaced to its closed position by the fluid pressure in the tire 3 and the bias applied by the spring 45. The wheel valve 39 is thereby closed and the transfer line 19 is sealed, inhibiting the venting of air from the tire 3 to atmosphere. The removal of the control valve assembly 7 facilitates routine maintenance and servicing, for example to replace the tire 3 and/or balance the vehicle wheel assembly 1. The tire 3 and the wheel 5 can be serviced according to conventional procedures after the control valve assembly 7 has been removed. Should the wheel 5 be damaged to an extent that the wheel 5 is no longer roadworthy, the wheel 5 can be replaced by any suitable conventional wheel. Vice versa, it will be understood that the wheel 5 can be mounted on any suitable vehicle not equipped with a CTIS, e.g. to replace a conventional wheel.

To assemble the vehicle wheel assembly 1, the control valve assembly 7 is located in the hub cavity 37 and displaced along the axis a-a until the retaining clips 69, 71 locate in the first annular recess 75. The closure member 31 engages the pin 53 and displaces the valve member 43 to its open position. The wheel valve 39 is thereby opened and fluid communication established between the tire 3 and the control valve 25. The second annular chamber 63 maintains fluid communication between the control valve 25 and the transfer line 19 irrespective of the angular orientation of the control valve assembly 7. The retaining clips 69, 71 help to prevent the control valve assembly 7 being displaced out of the hub cavity 37 due to the pressure increase when the wheel valve 39 is opened. The vehicle wheel assembly 1 can then be mounted to the vehicle hub. The nozzle 59 locates in the end of the drive shaft 15 and a seal is formed between the respective surfaces 66, 67. The vehicle wheel assembly 1 is secured in position by the wheel nuts (or bolts) in conventional manner.

Once installed, the control valve assembly 7 is operable to control the supply of compressed air from the compressor to the tire 3. Specifically, the control valve 25 is operable selectively to open and close the fluid pathway between the supply line 13 and the transfer line 19. In the present embodiment, the control valve 25 is actuated in response to changes in the pressure in the supply line 13. The control valve 25 comprises a latching mechanism which cycles through a sequence of operating modes to provide a normal operating mode; an inflate mode; a deflate/pressure check mode; and a reset mode. The ECU controls operation of the compressor C and/or the associated valve block VB to control the supply of compressed air to the supply line 13 to control operation of the control valve 25. It will be appreciated that the operating sequence of the control valve 25 could be changed with corresponding changes to the control strategy implemented by the ECU.

Although tire inflation operations have mostly been referred to in the above passages, it will be clear that the present invention can also be used in tire deflation modes, insofar as an appropriate control valve is used, for example one according to FIGS. 4A to 4D. During tire deflation, the compressed air from the tire 3 can be exhausted back through the supply line 13 to a reservoir or to atmosphere. The venting of air from the tire 3 can be controlled by the valve block VB. Alternatively, the control valve 25 could be configured to vent air from the tire 3 directly to atmosphere, for example through an outlet port, or the control valve 25 could be configured to return air from the tire cavity 4 to a bi-directional flow compressor for forced evacuation from the tire cavity 4 so as to greatly reduce tire deflation cycle time.

A service valve such as a Schrader valve can be provided on the wheel to provide a conventional means of checking and adjusting tire pressure. The Schrader valve could be provided on the wheel rim 11 or in the hub, for example in communication with a second conduit. The Schrader valve could be positioned diametrically opposite the wheel valve 39 to help balance the wheel assembly 1.

Embodiments of the present invention can be used to take pressurized air made available at the vehicle axle to the tire 3. In the above passages, we have described: a specifically designed wheel 5; a specifically designed control valve assembly 7, and a vehicle wheel assembly 1 resulting from the assembly of the wheel 5 and the control valve assembly 7.

Figure 7A:
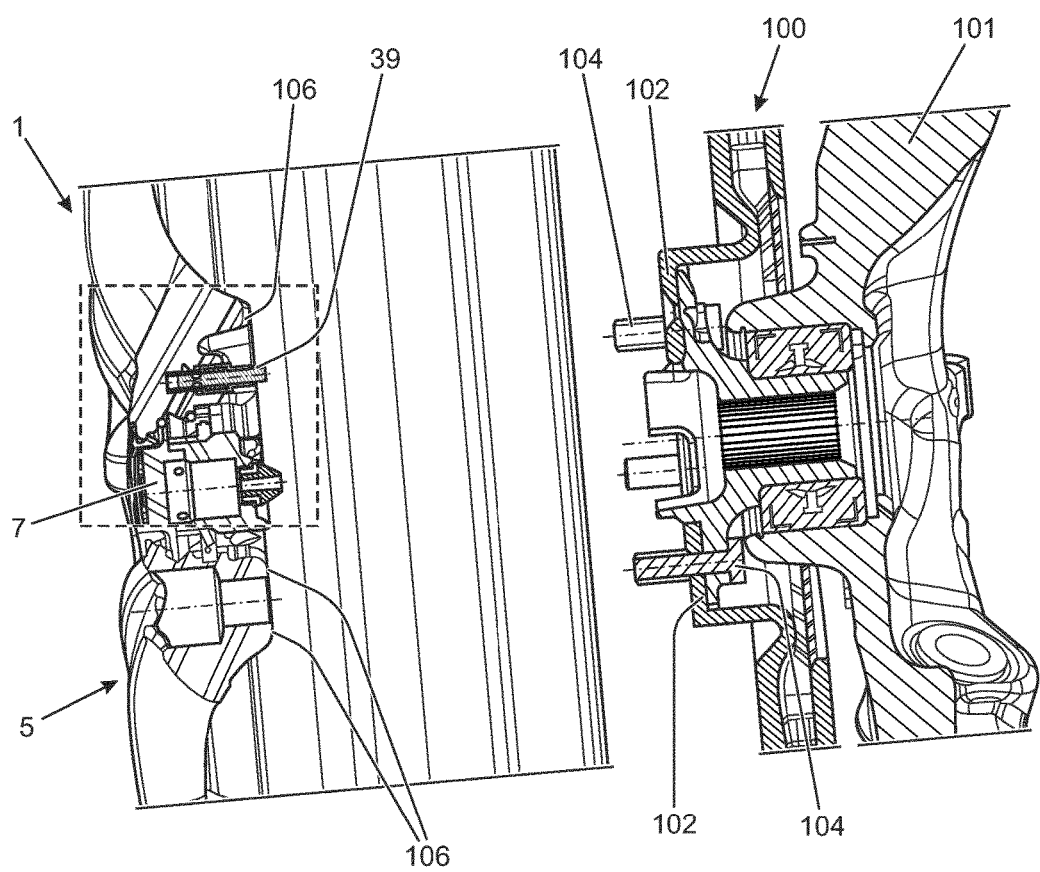
FIG. 7A is a sectional view of another vehicle wheel assembly and a vehicle wheel hub to which the wheel assembly can be mounted.
Figure 7B:
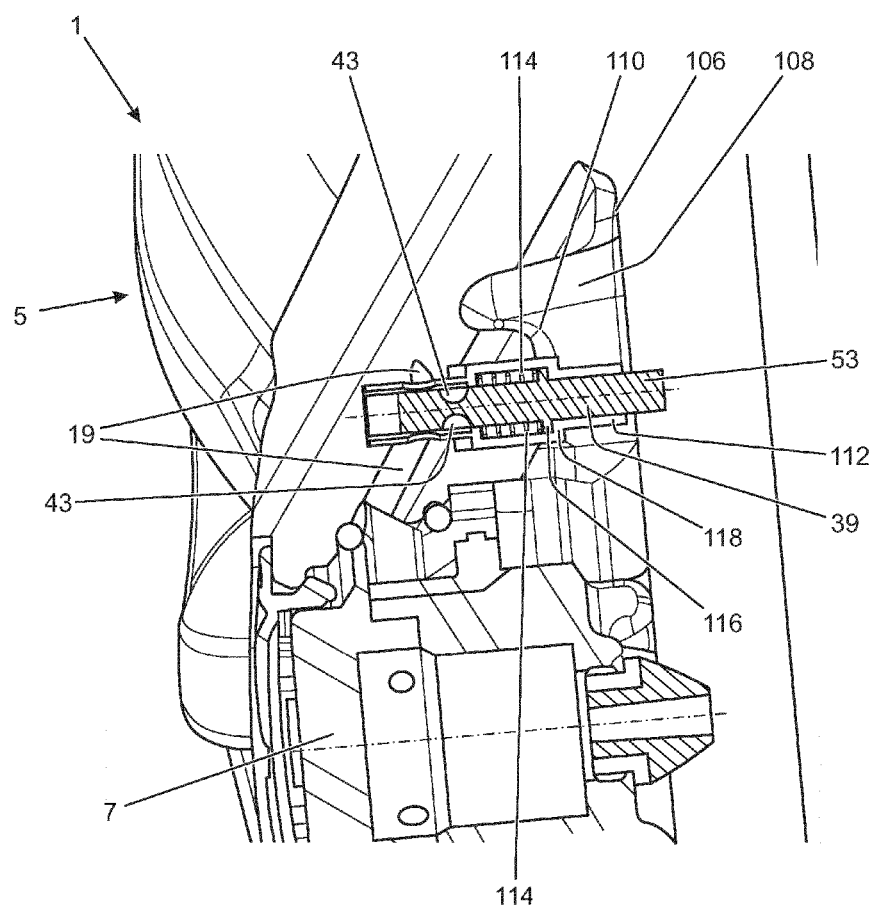
FIG. 7B is a detailed view of the area in dotted outline in FIG. 7A.
Figure 8A:
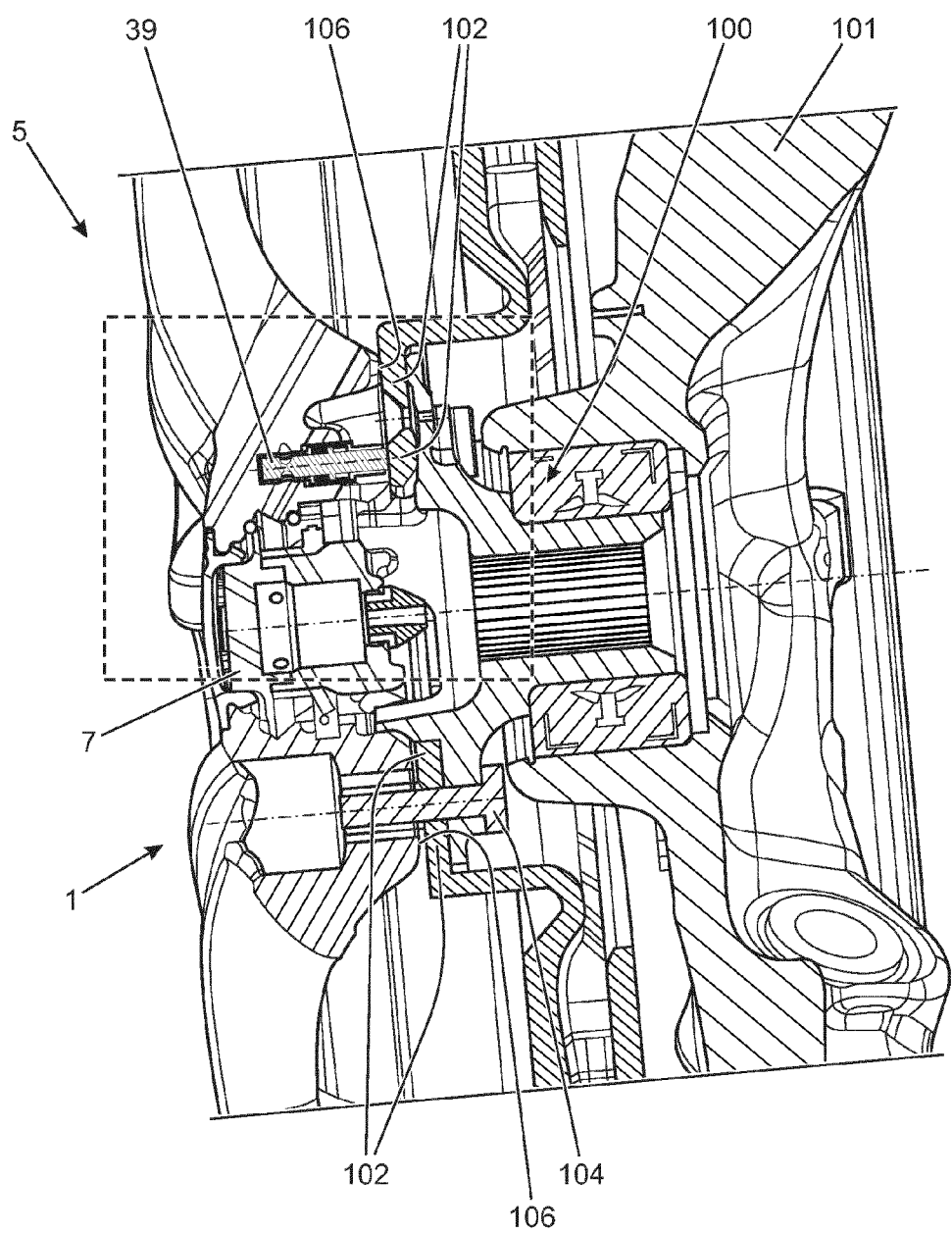
FIG. 8A is a sectional view of the vehicle wheel assembly of FIG. 7 showing the wheel assembly mounted on the vehicle wheel hub.
Figure 8B:
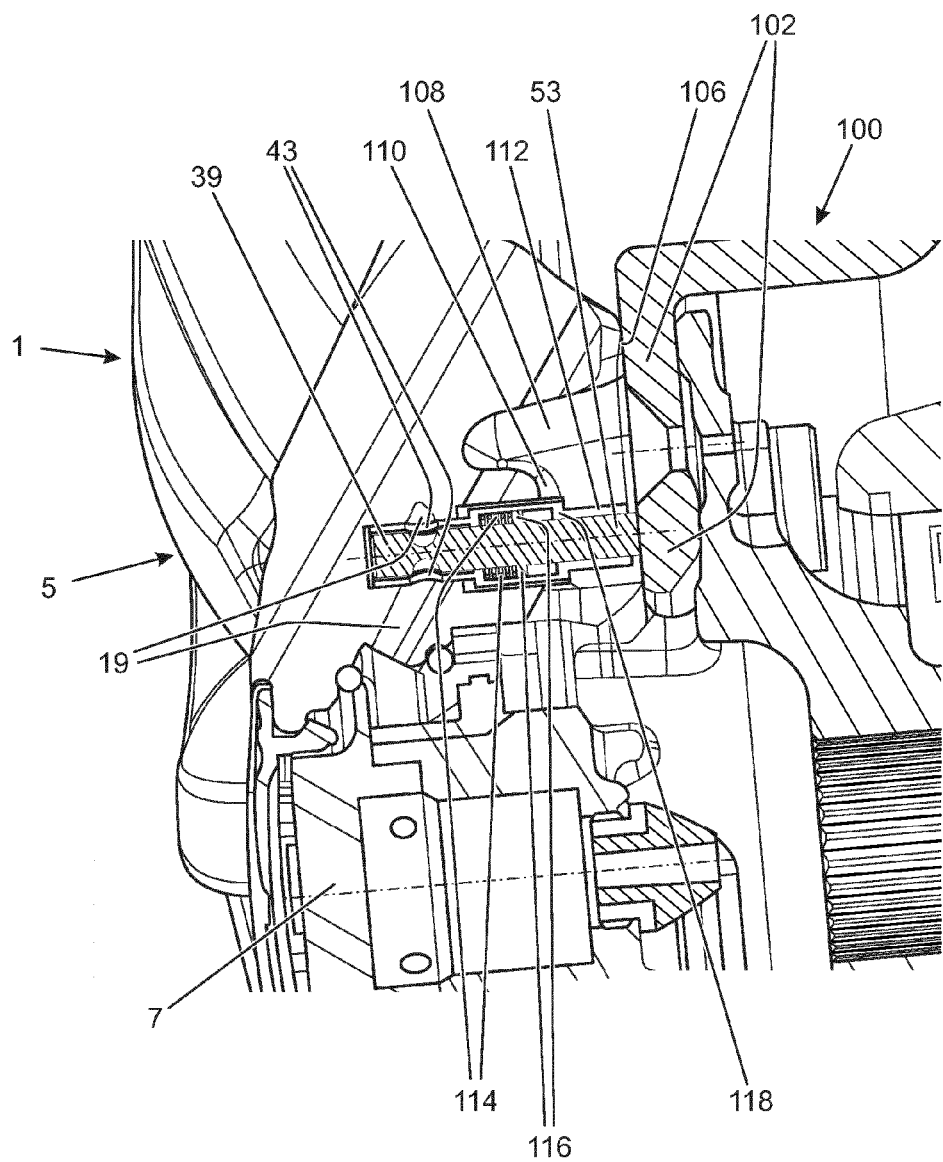
FIG. 8B is a detailed view of the area in dotted outline in FIG. 8A.

In the embodiment described herein, the in-wheel valve 39 has been provided to stop the tire from deflating once the control valve assembly 7 is removed from the wheel. The in-wheel valve 39 is actuated (held in the open state) when the control valve assembly 7 is fitted to the center of the wheel 5 by means of a mechanical action of a valve pin 53 being pressed down as the control valve assembly 7 is mounted to the wheel 5, thus opening the in-wheel valve 39. The in-wheel valve 39 thereby functions as an isolation valve which closes the transfer line 19 when the wheel 5 and the control valve assembly 7 are removed from the wheel hub, for example for tire fitting/balancing purposes. In a modified arrangement of the wheel assembly 1, this functionality is preserved but the location of the in-wheel valve 39 is changed. In particular, the in-wheel valve 39 is arranged such that the valve pin 53, which controls operation of the valve member 43, cooperates with the vehicle wheel hub rather than the control valve assembly 7. This modified arrangement, as illustrated in FIGS. 7 and 8, will now be described in more detail.

The vehicle wheel hub assembly 100, in use, is held in a knuckle 101. The vehicle wheel hub assembly 100 conventionally comprises a hub mounting flange 102 having a plurality of threaded studs 104 for mounting the wheel assembly 1. In the embodiment illustrated in FIGS. 7 and 8, the hub assembly 100 includes a brake disc(not shown), and the hub mounting flange 102 is provided by the brake disc. However, in other embodiments, the vehicle wheel hub may comprise other components which provide the hub mounting flange. In the modified arrangement of FIGS. 7 and 8, the in-wheel valve 39 is positioned radially outwardly of the control valve assembly 7 such that the valve pin 53 engages the hub mounting flange 102. The wheel has a wheel mating surface 106 which abuts the hub mounting flange 102 when the wheel assembly 1 is mounted to the vehicle hub 100. There are recesses 108 in the surface of the wheel 5 which is opposite the hub mounting flange 102 when the wheel assembly 1 is mounted to the vehicle hub 100. The recesses 108 have recessed surfaces 110 which do not abut the hub mounting flange 102. The in-wheel valve 39 comprises a valve housing 112 which surrounds the valve pin 53. The valve housing 112 and the valve pin 53 extend through an aperture formed in a recessed surface 110. The housing 112 extends from the recessed surface 110 a distance short of the wheel mating surface 106, such that, when the wheel assembly 1 is mounted to the vehicle hub 100, the housing 112 does not abut the wheel mating surface 106. The valve pin 53 extends further than the housing 112 such that it protrudes out of the recess 108, beyond the plane of the wheel mating surface 106, when the wheel assembly 1 is not mounted to the vehicle hub 100. The valve pin 53 can be arranged to extend perpendicular to the wheel mating surface 106. In an alternative embodiment, the valve pin 53 may extend through an aperture formed in a wheel mating surface 106 of the wheel 5. In such an arrangement, a valve housing 112 may not be needed. An O-ring or other sealing member can be provided around the valve pin 53 to prevent air loss.

In use, when the wheel assembly 1 is mounted to the vehicle wheel hub assembly 100, the hub mounting flange 102 engages the valve pin 53 and displaces the valve member 43 to its open position. The in-wheel valve 39 is thereby opened when the wheel assembly 1 is mounted to the vehicle hub. Conversely, when the wheel assembly 1 is removed from the vehicle wheel hub 100, the hub mounting flange 102 disengages from the valve pin 53 and the valve member 43 is returned to its closed position under the action of a coil spring 114. The in-wheel valve 39 is thereby closed when the wheel assembly 1 is removed from the vehicle wheel hub 100. The position of the valve pin 53 when disengaged from the hub mounting flange 102 is controlled by a pin protrusion 116 which abuts a stop 118 formed in the housing 112. In this modified arrangement, the removal or fitting of the control valve assembly 7 can be performed without actuating the in-wheel valve 39. The operation of the wheel assembly 1 is unchanged from that of the embodiment described herein.

It will be appreciated that the in-wheel valve 39 can be actuated by various means, including the fitting of the control valve assembly 7, and/or the fitting of the wheel assembly 1 to the vehicle.

Various alternative embodiments of the control valve assembly 7 and vehicle wheel assembly 1 exist. Those features in common with the aforementioned embodiment are not necessarily expressly described and those which are described are labelled 500 greater.

Figure 9:
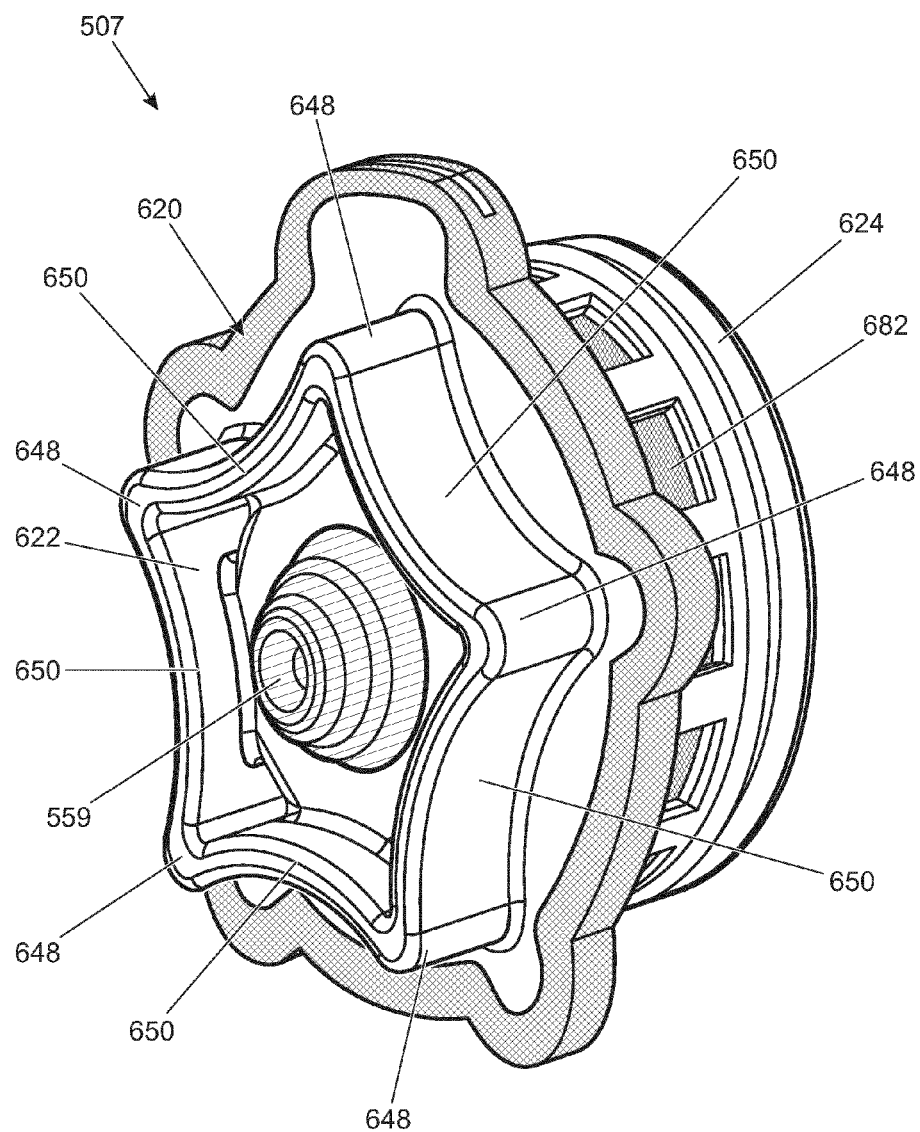
FIG. 9 is a perspective view of a control valve assembly according to an embodiment of the present invention.
Figure 10:
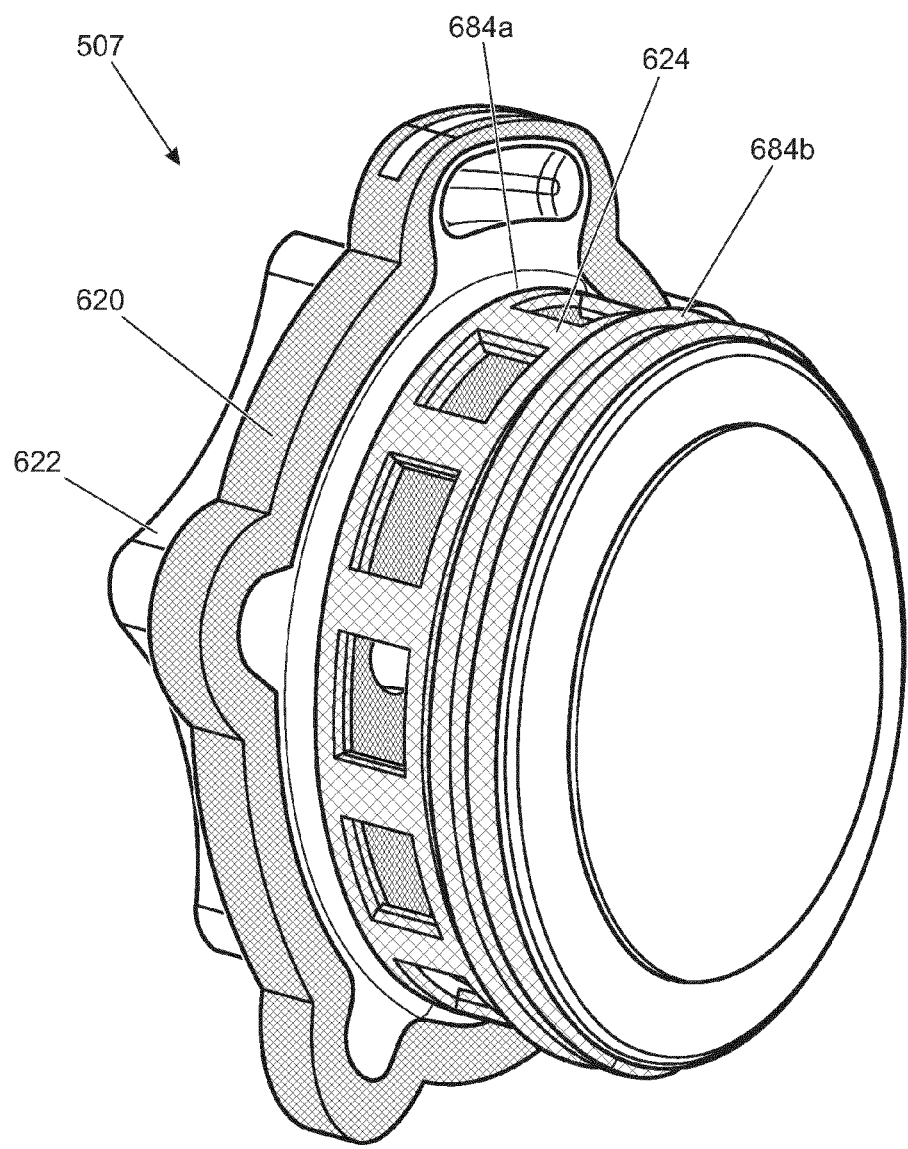
FIG. 10 is a reverse perspective view of the control valve assembly from FIG. 9.

With reference to FIG. 9 and FIG. 10, according to a further embodiment, the control valve 507 includes a peripheral flange 620, a grip 622, a nozzle 559, and a cage 624.

Figure 11:
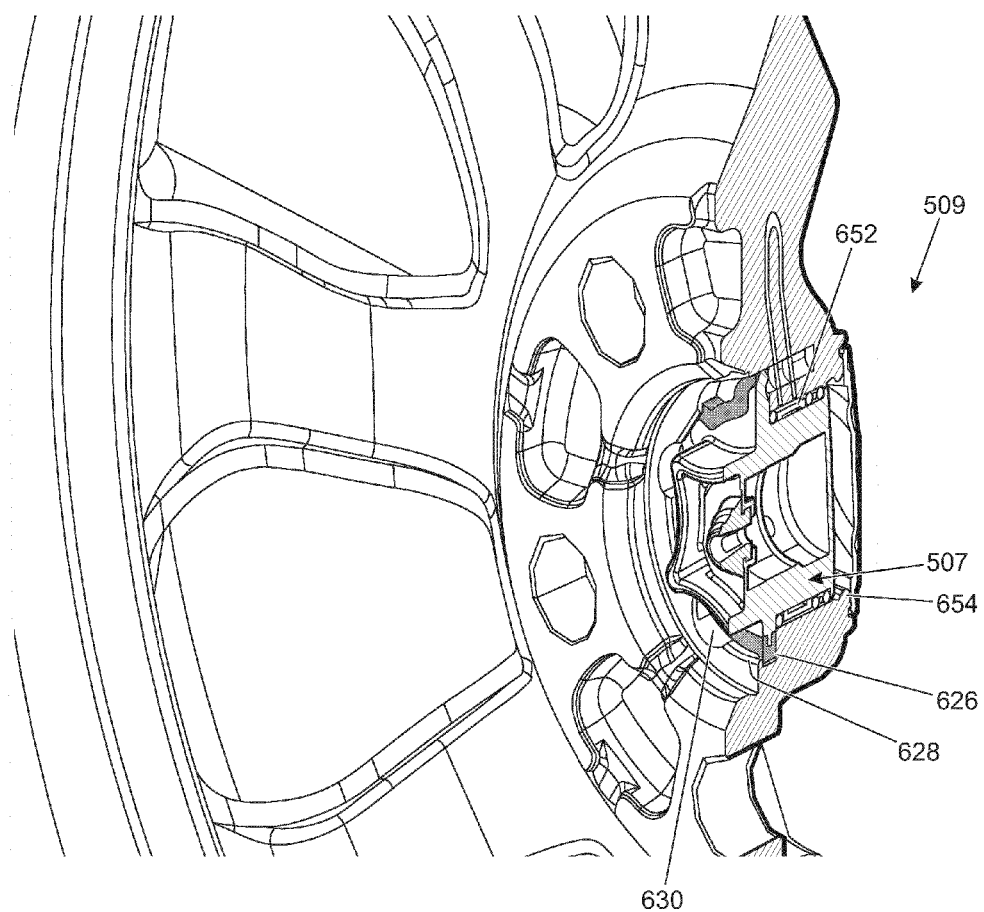
FIG. 11 is a sectioned perspective view of a vehicle wheel assembly including the control valve assembly from FIG. 9.

With reference to FIG. 11, the wheel hub 509 is shown having the control valve assembly 507 installed therein. The wheel hub 509 comprises a track 626 including circumferentially spaced overhangs 628 each separated by a gap 630.

Figure 12:
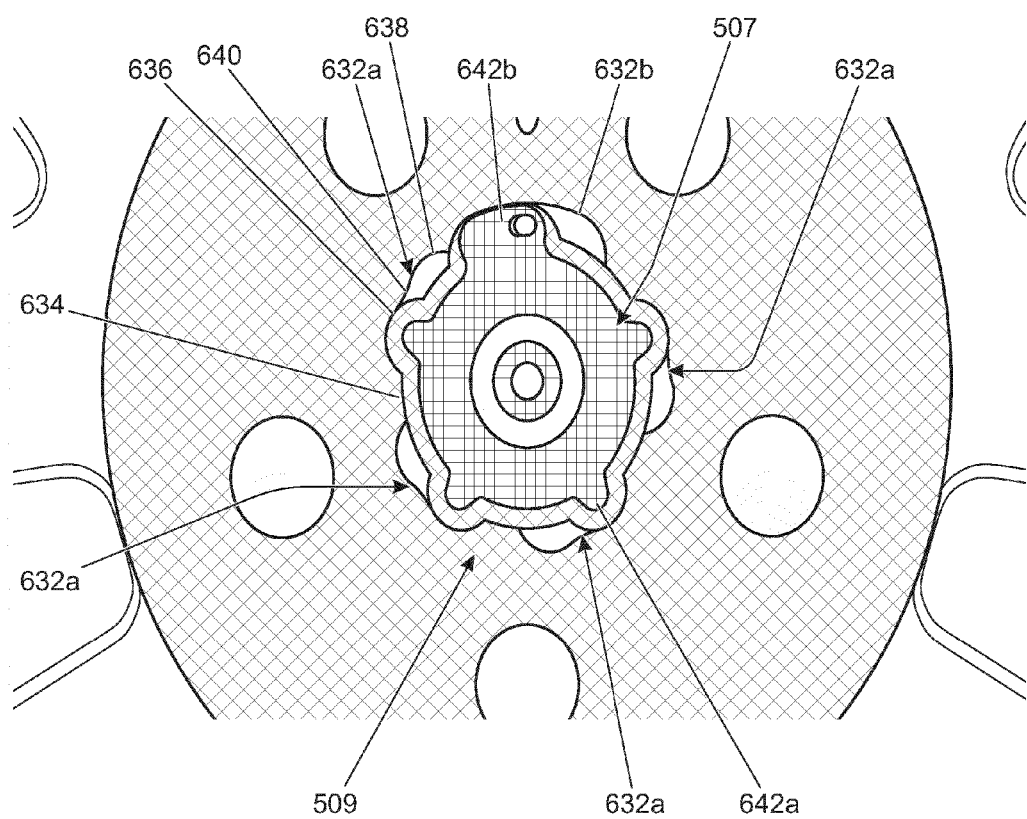
FIG. 12 is a front view of the control valve assembly of FIG. 9 in an unlocked orientation.

With reference to FIG. 12, the track 626 includes five channels each separated by a shoulder 634. Four of the five channels 632a are bilobal, each having two lobes 636, 638 separated by a rib 640. The rib 640 extends generally inwardly, that is to say towards the axis of rotation, relative to the two lobes 636, 638. Each gap 630 is aligned with one of the lobes 636 whereas the overhangs 628 are aligned with the other lobes 638. The other, unique, channel 632b is broader than the others and does not include the rib 640 but rather includes a single lobe. Similarly, the gap covering part of the unique single lobed channel 632b is broader than the other gaps 630.

With further reference to FIGS. 9 and 10, the peripheral flange is generally circular in shape having five bosses 642 (FIG. 12) extending radially outwards. Four of the bosses 642a are identical. One boss 642b is shaped differently to the other bosses 642a. This unique boss 642b is broader than the others. The peripheral flange 620 is made from a compliant material, such as a suitable elastomer. The gaps 630 (shown in FIG. 11) of the wheel hub 509 are orientated and positioned to correspond with the bosses 642 when the valve assembly 507 is placed in an unlocked condition as will be described further. Specifically, there are four narrow gaps 630a and one broad gap 630b. In this way, in a first orientation, when the bosses 642 are aligned with the gaps 630, the control valve assembly 507 can pass axially past the overhang 628 to an installed location within the hub 509. The unique boss 642b can only fit through one gap 630b, namely, the relatively broad gap 630b, such that the control valve assembly is limited to fitting to the hub in a single orientation. In this way, the broad boss 642b and the broad gap 630b form an alignment element.

Figure 13:
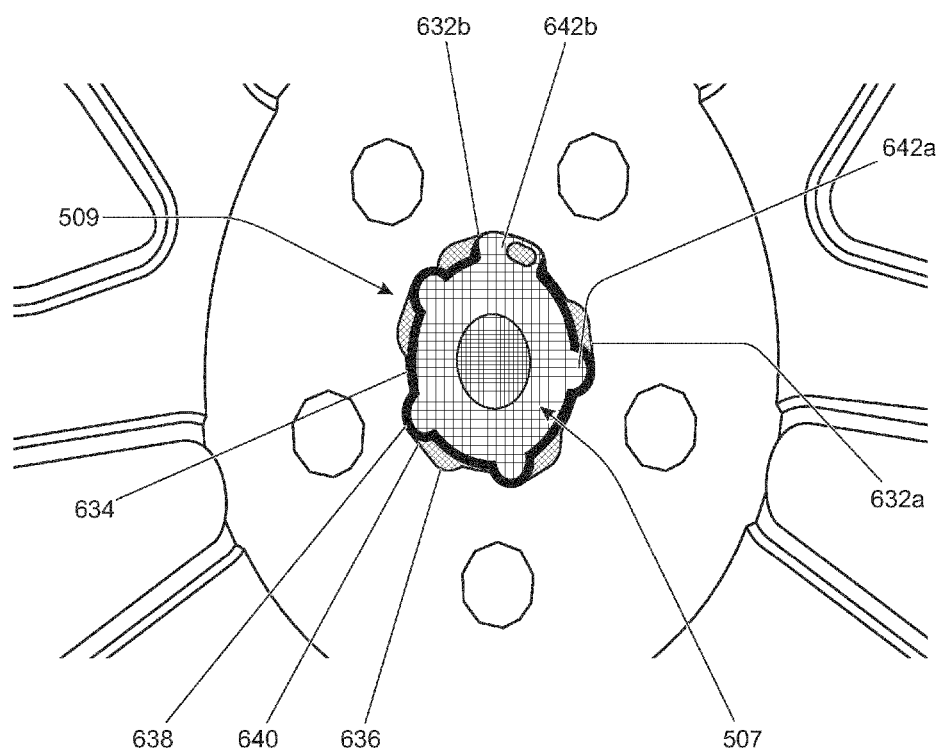
FIG. 13 is a similar view as FIG. 12 of the control valve assembly in a locked orientation.

In the installed location, the control valve assembly 507 is rotatable from the first orientation corresponding to an unlocked condition, to a second orientation corresponding to a locked condition, by clockwise movement of the control valve assembly 507. FIG. 12 shows the control valve assembly in the unlocked condition. FIG. 13 shows the control valve assembly in the locked condition.

In the first (unlocked) orientation, each boss 642 is aligned one of the lobes 636. In the second (locked) orientation, each boss 642 is aligned with the other lobes 638. When moving between the unlocked and locked orientations, the bosses 642 deflect inwardly by the ribs 640 then rebound to their neutral undeflected positions when aligned with the second lobes 638 in the locked orientation. When in the locked orientation, the control valve assembly 507 is prevented from separating axially from the wheel hub 509 since the bosses 642 are aligned with the overhangs 628. The rib 640, the overhang 628, and the shoulder 634 thus cooperate to secure the bosses 642 in the locked orientation.

In this way, the control valve assembly 507 includes features arranged to provide a locking mechanism for engagement with corresponding features in the wheel, in the form of a twist lock, which may be selectively engaged to lock or unlock the control valve assembly 507 within the wheel hub 509.

When the control valve assembly 507 is mounted within the wheel hub 509, the peripheral flange 620 forms a compliant ring providing a damping element to damp vibrations which may otherwise adversely affect the valve assembly 507.

With further reference to FIGS. 9 and 10, the control valve assembly 507 also includes a gripping formation in the form of a grip 622, arranged to provide a suitable surface for grasping by hand during installation into- or removal from the wheel. The grip 644 is in the form of a wall extending axially from the control valve in a direction away from the wheel hub 509 (FIG. 11), in-use. The wall is continuous and includes five peaks 648 and troughs 650. Each peak 648 is aligned with a boss 642. There are five troughs 650 so as to allow a user to grip the control valve assembly 507 using each finger and thumb of their hand. In this way, the control valve assembly 507 can be fitted to the wheel hub 509 by hand so that no additional tooling is required to fit or remove the valve assembly 507 to/from the wheel hub 509. It will be appreciated that this gripping feature may be further provided with surface formations such as knurling etc. to further optimize the surface of the wall for grasping by hand.

With further reference to FIG. 11, the wheel hub 509 comprises a mounting structure 652 in the form of an annular wall for removably receiving the control valve assembly 507 within the wheel hub 509. In addition, the wheel hub 509 includes a sacrificial lip 654 extending radially inwardly relatively to the mounting structure 652. The sacrificial lip 654 is used to support the wheel hub 509 when removed from the vehicle during maintenance operations. In these off-vehicle operations, the wheel may be placed on a balancing shaft or other such servicing tool commonly used for wheel and/or tire maintenance or repair. The sacrificial lip 654 can be damaged and wear during such operations throughout the life of the vehicle without compromising the usability of the wheel.

Figure 14:
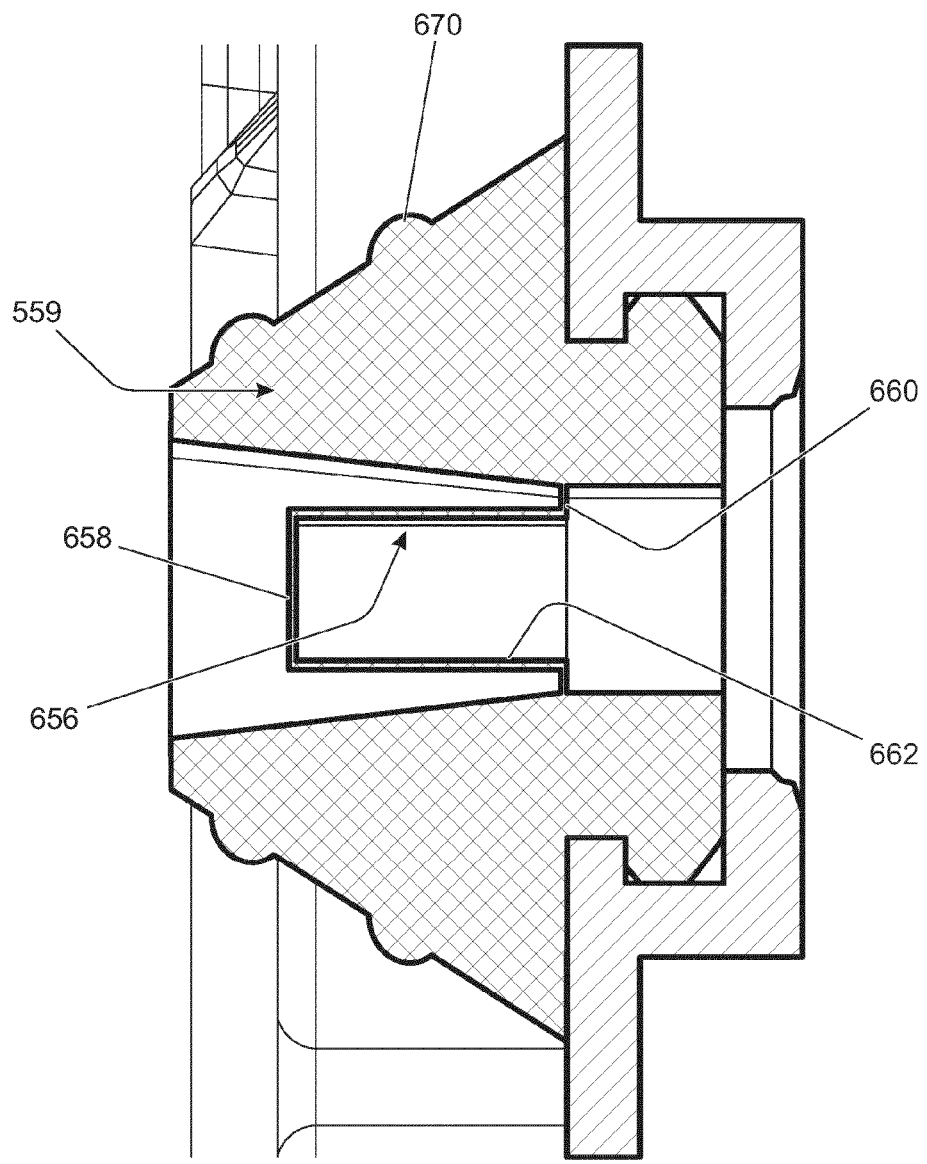
FIG. 14 is a section view of a mounting formation of an inlet of the control valve from FIG. 9.

With reference to FIG. 14, the nozzle 559 of this embodiment is a mounting formation for mounting the control valve assembly 507 to the axle stub (not shown in FIG. 14). The nozzle 559 includes a supply line filter 656 for filtering air flowing from the supply line, in the stub axle, to the control valve assembly 507. Though in principle, the supply line filter 656 can also filter air flow in the reverse direction. Various different structural configurations of filter are possible, two of which are described below.

Still with reference to FIG. 14, a first supply line filter configuration is in the form of a 'top-hat' having a cap or disc 658 separated axially from a rim or annulus 660 by a cylinder 662. The disc 658 is upstream of the annulus 660 when filtering air from the supply line entering the control valve assembly. The 'top-hat' shape limits clogging of the supply line filter 656 to the region adjacent to annulus 660 allowing particles to collect at a downstream end of the filter, so leaving the upstream region adjacent the disc 658 relatively clear of debris. In this way, the disc 658, and the upstream end of the cylinder 662 remain free for filtering air flow.

Figure 15:
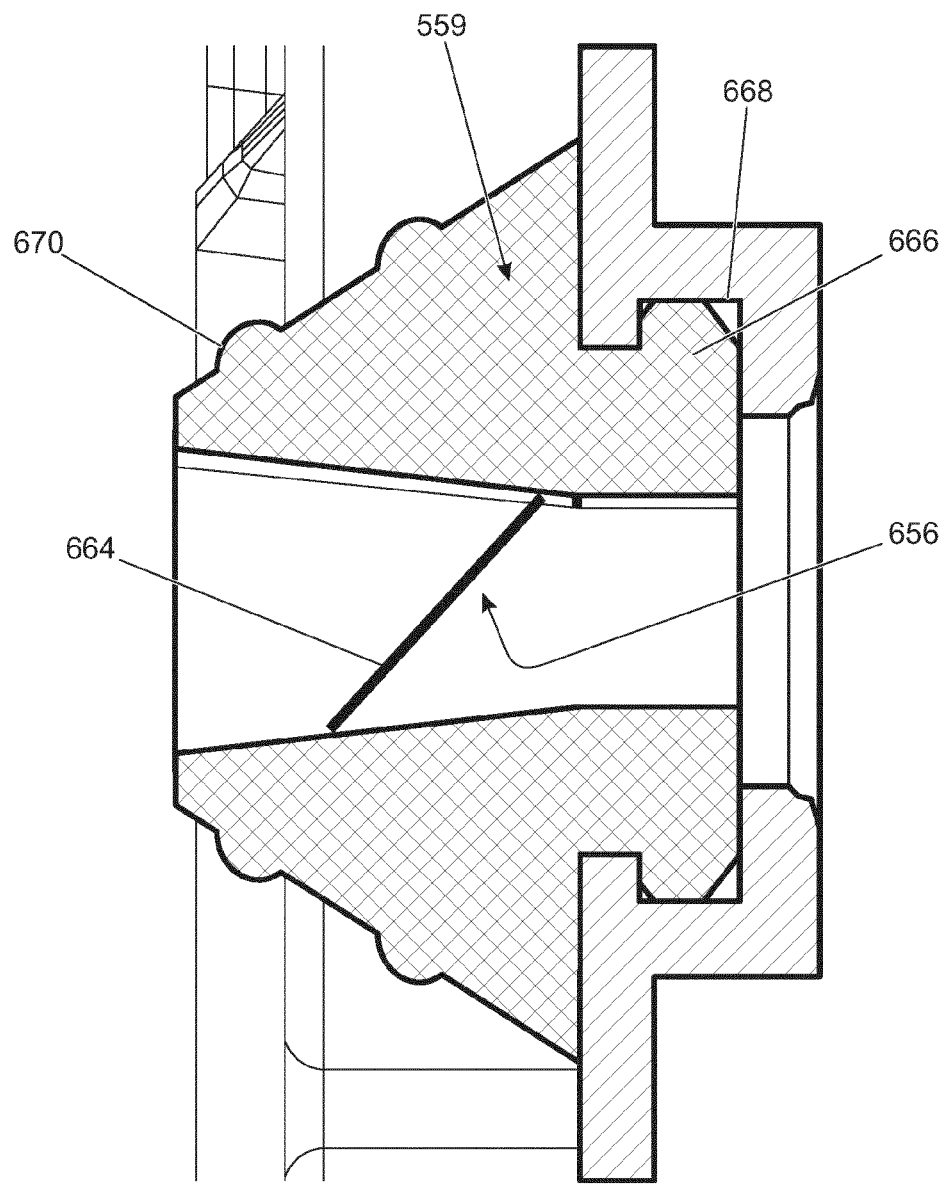
FIG. 15 is a similar view as FIG. 14 of an alternative mounting formation.

With reference to FIG. 15, an alternative supply line filter 656 configuration is shown, in the form of a disc 664 mounted diagonally within the nozzle aperture to be inclined relative to air impinging on the supply line filter 656. The supply line filter 656 thus collects particulate matter at a downstream end leaving the upstream end relatively free for filtering purposes.

Regardless as to the configuration of the supply line filter 656 implemented in the nozzle 559, the nozzle 559 and the supply line filter 656 are integrally formed as a substantially monolithic structure. The nozzle 559 includes an annular flange 666 mounted within a groove 668 of the control valve. Since the nozzle 559 is made from a resilient material, the nozzle 559 can be removably and replaceably mounted to the control valve by deflection of the flange 666 passing through to the groove 668.

The nozzle 559 also includes finger grips 670 in the form of annular formations. The finger grips allow for easy removal by a user's fingers. Accordingly, there is no need for additional tooling to install and remove the nozzle 559 when replacement is required.

Figure 16:
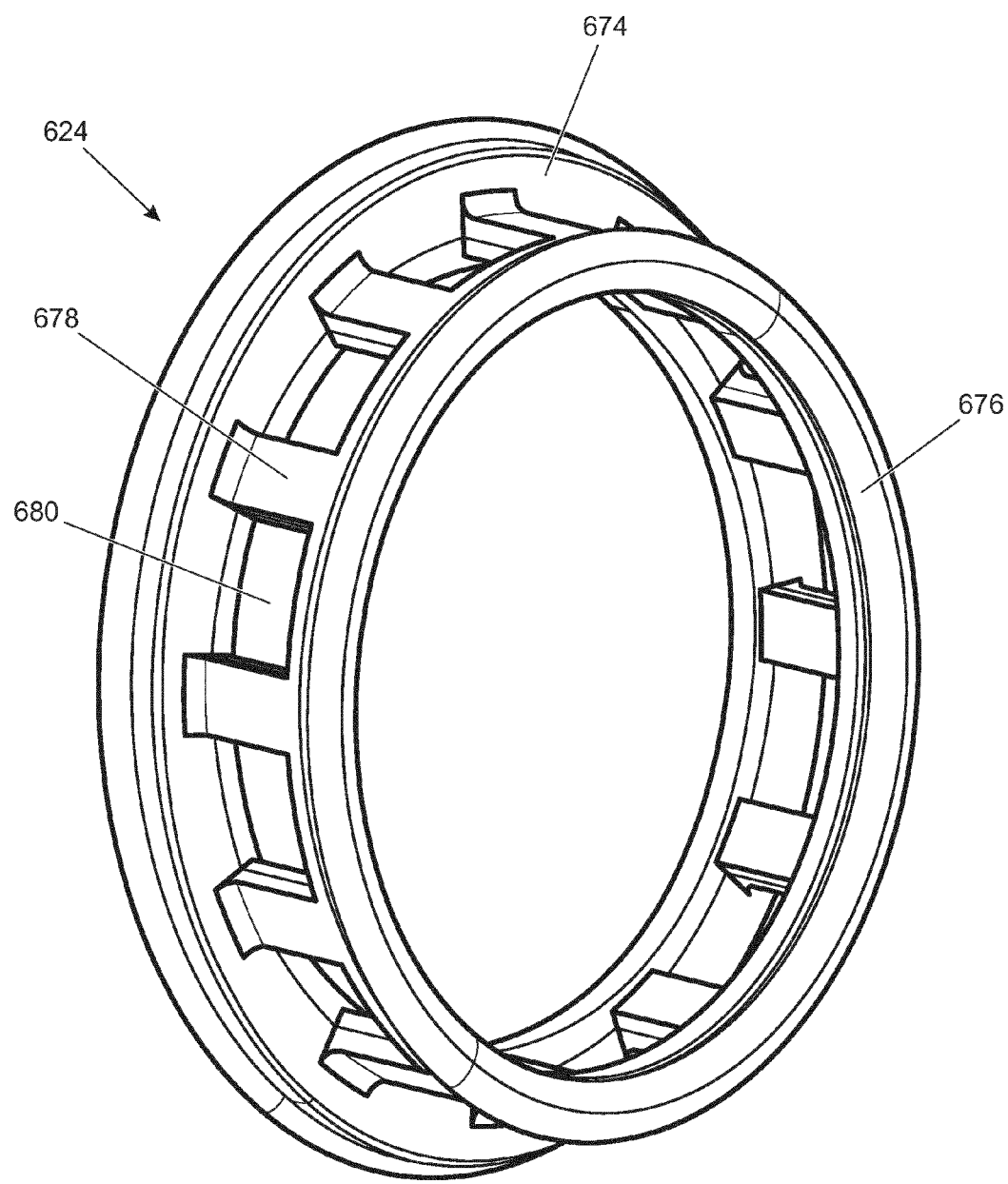
FIG. 16 is a perspective view of an annular filter cage from the control valve assembly from FIG. 9.

With reference to FIG. 16, the cage 624 is provided as an annular cage, which annular cage 624 includes a base ring 674 and a satellite ring 676 joined together by a plurality of axial spokes 678. Intermediate the spokes 678 are a plurality of windows 680. The cage 624 supports an annular transfer line filter. The transfer line filter includes a plurality of transfer line filter elements 682 (FIG. 9) each received within a window 680 intermediate adjacent spokes 678. Specifically, air flowing from the transfer line to the control valve assembly is filtered by the transfer line filter elements 682, though reverse air flow may also be filtered during tire inflation for instance. Thus any debris in the tire cavity is precluded from entering the control valve assembly during tire deflation, further extending the service life of the control valve assembly and other components of the central tire inflation system. With further reference to FIGS. 9 and 10, the base ring 674 and satellite ring 676 abut opposing O-rings 684a,b to maintain a separation distance between them. The cage 624 thus serves two functions, firstly as an O-ring spacer and secondly as a filter holder so that the annular filter can be removed and replaced when clogged.

The invention claimed is:

1. A control valve assembly comprising;
 an inlet for receiving compressed air from a supply line;
 an outlet for supplying compressed air to a transfer line;
 a control valve for selectively placing the inlet in fluid communication with the outlet; and an annular cage removably and replaceably mounted around the control valve;

wherein the control valve assembly is configured to be removably disposed in a wheel hub; and wherein the control valve assembly comprises a filter for filtering air moving between the supply line and the transfer line; and wherein the filter comprises a transfer line filter arranged to filter air moving between the control valve and the transfer line, wherein the annular cage supports the transfer line filter; and wherein the annular cage comprises a plurality of axial spokes having a plurality of transfer line filters therebetween.

2. The control valve assembly of claim 1 wherein the inlet comprises a mounting formation and wherein the filter includes a supply line filter supported by the mounting formation, wherein the supply line filter is arranged to filter air moving between the control valve and the supply line.

3. The control valve assembly of claim 2 wherein the supply line filter is one of a "top-hat" shaped extending upstream and a disc oriented diagonally to air entering from the supply line.

4. The control valve assembly of claim 2 wherein the mounting formation is formed integrally with the supply line filter as a substantially monolithic structure.

5. The control valve assembly of claim 4 wherein the mounting formation is removably and replaceably mounted to the inlet.

6. The control valve assembly of claim 2 wherein the mounting formation comprises one or more finger grips.

* * * * *